United States Patent [19]
Tsubata et al.

[11] Patent Number: 5,762,825
[45] Date of Patent: Jun. 9, 1998

[54] LIQUID CRYSTAL MIXTURE AND LIQUID CRYSTAL DEVICE COMPRISING THE SAME

[75] Inventors: Yoshiaki Tsubata; Kyoko Yamamoto; Koichi Fujisawa, all of Ibaraki; Yukari Fujimoto; Tsutomu Matsumoto, both of Osaka; Masayoshi Minai, Shiga; Chizu Sekine, Ibaraki, all of Japan

[73] Assignee: Sumitomo Chemical Company, Limited, Osaka, Japan

[21] Appl. No.: 538,909

[22] Filed: Oct. 4, 1995

[30] Foreign Application Priority Data

Oct. 5, 1994 [JP] Japan .................. 6-268295
May 23, 1995 [JP] Japan .................. 7-149548

[51] Int. Cl.$^6$ .......... C09K 19/06; C09K 19/34; C09K 19/30; C09K 19/12
[52] U.S. Cl. .......... 252/299.6; 252/299.61; 252/299.63; 252/299.65; 252/299.67; 252/299.66
[58] Field of Search .......... 252/299.6, 299.66, 252/299.61, 299.01, 299.63, 299.65, 299.67

[56] References Cited

U.S. PATENT DOCUMENTS

| | | | |
|---|---|---|---|
| 5,068,053 | 11/1991 | Reiffenrath et al. | 252/299.61 |
| 5,164,114 | 11/1992 | Kurmeier et al. | 252/299.61 |
| 5,447,657 | 9/1995 | Schad et al. | 252/299.01 |
| 5,582,767 | 12/1996 | Buchecker et al. | 252/299.66 |
| 5,658,489 | 8/1997 | Higashii et al. | 252/299.01 |

FOREIGN PATENT DOCUMENTS

| | | |
|---|---|---|
| 0 377 516 | 7/1990 | European Pat. Off. |
| 0 648 723 | 4/1995 | European Pat. Off. |
| WO 88/07523 | 10/1988 | WIPO |
| WO 94/03556 | 2/1994 | WIPO |

Primary Examiner—C. H. Kelly
Attorney, Agent, or Firm—Birch, Stewart, Kolasch & Birch, LLP

[57] ABSTRACT

A liquid crystal mixture containing (a) at least one compound of a compound of the formula (1):

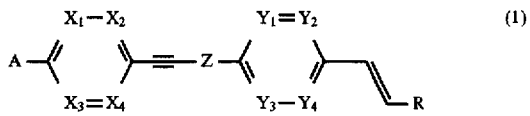

in which R is a $C_1$–$C_{12}$ alkyl group, etc.; $X_1$, $X_2$, $X_3$, $X_4$, $Y_1$, $Y_2$, $Y_3$ and $Y_4$ represent, independently each other, CH, CF or N; A is a hydrogen atom, a 4-$R_1$-(cycloalkyl) group, etc. in which R is a $C_1$–$C_{12}$ alkyl group, etc. and p is 0 or 1; and Z is —C≡C— or a single bond, and (b) at least one compound of the formula (4):

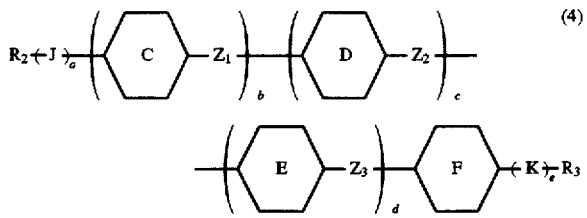

wherein rings C, D, E and F represent, independently each other, 1,4-phenylene, etc. which may be substituted by 1, 2 or 3 fluorine atoms; $R_2$ is a hydrogen atom, a $C_1$–$C_{12}$ alkyl group, etc.; $R_3$ is a hydrogen atom, a fluorine atom, a fluoromethyl group, etc.; $Z_1$, $Z_2$ and $Z_3$ represent, independently each other, —COO—, —OCO—, —OCH$_2$—, —CH$_2$O—, a $C_1$–$C_5$ alkylene group, a $C_2$–$C_5$ alkenylene group, etc.; J and K represent, independently each other, a methylene group or —O—; a, b, c, d and e represent, independently each other, 0 or 1.

20 Claims, No Drawings

LIQUID CRYSTAL MIXTURE AND LIQUID CRYSTAL DEVICE COMPRISING THE SAME

BACKGROUND OF THE INVENTION

1. Field of the Invention

The present invention relates to a novel nematic liquid crystal mixture and a liquid crystal device comprising the same. In particular, the present invention relates to a liquid crystal mixture having a large anisotropy of refractive index ($\Delta n$) and a liquid crystal device comprising the same, for example, an optical shutter, a display device such as a super twisted nematic (STN) liquid crystal device or a polymer dispersed liquid crystal (PDLC) device, and so on.

2. Description of the Related Art

With the recent progress of information society, the importance of various display devices as one of man-machine interfaces increases greatly. In such circumstance, a flat display, in particular, a liquid crystal display (LCD) has been quickly spread because it has various characteristics such as thinness, light weight, driving at a low voltage, low consumption of electric power, and the like. Among the liquid crystal devices one of typical examples of which is a liquid crystal display, a matrix type liquid crystal display, which stores a large amount of information, has two driving systems, that is, an active matrix system and a passive matrix system.

In the active matrix system, a thin film transistor (TFT) such as a polysilicon or amorphous silicon or a diode is provided on each pixel as a non-linear element. However, the active matrix system has some problems in increasing a picture area, lowering a price and increasing a density, because of complicated production processes and low yield. In view of a price and productivity, the passive matrix system is more attractive than the active matrix system.

As the passive matrix liquid crystal devices which are practically used, twisted nematic (TN) and STN liquid crystal devices are mainly used. The TN liquid crystal devices are widely used as display devices of watches or portable calculators. With this system, it is difficult in principle to set up a display having a large picture area, since rise of electrooptical properties is slow, and a contrast is considerably decreased with the increase of a duty ratio.

The STN liquid crystal device was developed to solve such drawbacks of the TN liquid crystal display device. Since the STN liquid crystal device has sharply rising electrooptical properties, it makes it possible to make a large picture area. These days, the STN liquid crystal devices are used as displays of lap top personal computers, and so on.

However, while the STN liquid crystal device has better properties than the TN liquid crystal device, it still has some problems to be solved for further increase of the picture area, decrease of a price and increase of a density.

For example, in comparison with the TFT liquid crystal device which is one of the typical example of the active matrix liquid crystal device, the STN liquid crystal device is insufficient in a view angle and a response speed. In particular, further increase of the picture area and the density are inevitable, and increase of the response speed is essential for displaying motion pictures.

To achieve the high response speed of the STN liquid crystal device, decrease of a cell thickness is one of effective methods. The STN liquid crystal device utilizes a birefringence effect for displaying. To use this system, it is necessary to suppress the change of color tones and optical characteristics of a panel, that is, to limit a retardation in a specific optimum range. Since the retardation R is expressed by the formula:

$$R = \Delta n \times d \tag{1}$$

wherein $\Delta n$ is an anisotropy of refractive index, and d is a thickness of the cell, the anisotropy of refractive index $\Delta n$ should be made large to decrease the thickness d of the cell.

But, in general, a liquid crystal mixture having the large $\Delta n$ has a large viscosity. Then, such mixture is not suitable for increasing the response speed of the liquid crystal device. Therefore, a liquid crystal mixture having a large $\Delta n$ and a low viscosity is desired.

A dependency of $\Delta n$ on temperature is one of the problems to be solved. To suppress the change of $\Delta n$ in a working temperature range, it is generally effective to increase a transition temperature of the liquid crystal mixture.

Further, in view of the low consumption of electric power, it is advantageous to decrease a threshold voltage. To this end, it is necessary to increase an anisotropy of dielectric constant $\Delta \varepsilon$.

SUMMARY OF THE INVENTION

An object of the present invention is to provide a liquid crystal mixture having a large anisotropy of refractive index ($\Delta n$).

Another object of the present invention is to provide a liquid crystal mixture having a large anisotropy of dielectric constant ($\Delta \varepsilon$) in addition to the large anisotropy of refractive index ($\Delta n$).

A further object of the present invention is to provide a liquid crystal mixture which has a N (nematic) phase in a wide temperature range including room temperature.

A yet another object of the present invention is to provide a liquid crystal mixture which has a low viscosity and a small response parameter ($\eta/\Delta n^2$), whereby it is excellent in response properties.

A yet further object of the present invention is to provide a liquid crystal device comprising such liquid crystal mixture.

According to a first aspect of the present invention, there is provided a liquid crystal mixture comprising (a) at least one compound selected from the group consisting of a compound of the formula (1):

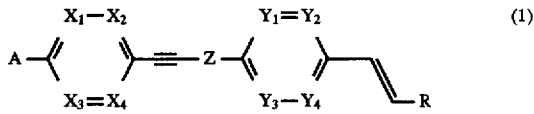

wherein R is a $C_1$–$C_{12}$ alkyl group, a $C_2$–$C_{16}$ alkenyl group or a $C_2$–$C_{16}$ alkoxyalkyl group; $X_1$, $X_2$, $X_3$, $X_4$, $Y_1$, $Y_2$, $Y_3$ and $Y_4$ represent, independently each other, CH, CF or N; A is a hydrogen atom, a 4-$R_1$-(cycloalkyl) group, a 4-$R_1$-(cycloalkenyl) group or a $R_1$—(O)$_p$ group in which $R_1$ is a $C_1$–$C_{12}$ alkyl group, a $C_2$–$C_{12}$ alkenyl group, a $C_2$–$C_{12}$ alkynyl group or a $C_2$–$C_{12}$ alkoxyalkyl group, and p is 0 or 1; and Z is —C≡C— or a single bond, a compound of the formula (2):

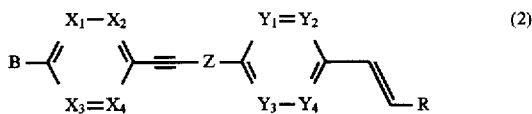

wherein B is a fluorine atom, a trifluoromethyl group, a trifluoro-methoxy group or a cyano group; and R, $X_1$, $X_2$, $X_3$, $X_4$, $Y_1$, $Y_2$, $Y_3$, $Y_4$ and Z are the same as defined in the formula (1) and a compound of the formula (3):

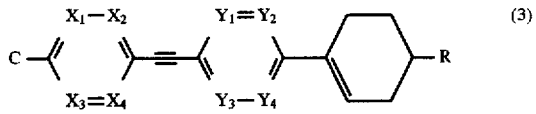

wherein C is a $C_1$–$C_{12}$ alkyl group, a $C_2$–$C_{12}$ alkenyl group, a $C_2$–$C_{16}$ alkoxyalkyl group, a 4-$R_1$-(cycloalkyl) group, a 4-$R_1$-(cycloalkenyl) group or a $R_1$—(O)$_p$ group, a fluorine atom, a trifluoromethyl group, a trifluoromethoxy group or a cyano group; and R, $X_1$, $X_2$, $X_3$, $X_4$, $Y_1$, $Y_2$, $Y_3$, $Y_4$, $R_1$ and p are the same as defined in the formula (1), and (b) at least one compound of the formula (4):

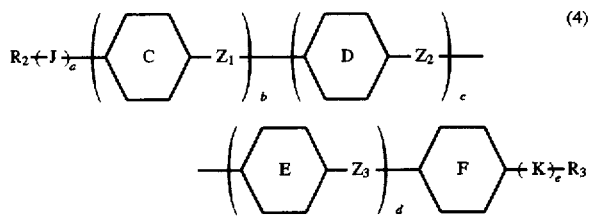

wherein rings C, D, E and F represent, independently each other, 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which may be substituted by 1, 2 or 3 fluorine atoms; $R_2$ is a hydrogen atom, a $C_1$–$C_{12}$ alkyl group, a $C_2$–$C_{12}$ alkenyl group, a $C_1$14 $C_{16}$ alkoxy group or a $C_2$–$C_{16}$ alkoxyalkyl group; $R_3$ is a hydrogen atom, a fluorine atom, a fluoromethyl group, a difluoromethyl group, a trifluoromethyl group, a fluoromethoxy group, a difluoromethoxy group, a trifluoromethoxy group, a cyano group, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; $Z_1$, $Z_2$ and $Z_3$ represent, independently each other, —COO—, —OCO—, —OCH$_2$—, —CH$_2$O—, a $C_1$–$C_5$ alkylene group, a $C_2$–$C_5$ alkenylene group, a $C_2$–$C_5$ alkynylene group or a single bond; J and K represent, independently each other, a methylene group or —O—; a, b, c, d and e represent, independently each other, 0 or 1 with the proviso that a sum of b, c and d is at least 1 (one), that when $R_2$ is an alkoxy group, a is 0 (zero), that when $R_3$ is an alkoxy group, e is 0 (zero), and that in the case where $R_2$ and $R_3$ are not alkoxy groups, a is 1 when b is 1 and the ring C is a 1,4-phenylene, 2,5-pyrimidinediyl, 5,2-pyrimidinediyl, 2,5-pyridinediyl or 5,2-pyridinediyl, or when b is 0, c is 1 and the ring D is 1,4-phenylene, 2,5-pyrimidinediyl, 5,2-pyrimidinediyl, 2,5-pyridinediyl or 5,2-pyridinediyl, or when b is 0, c is 0, d is 1 and the ring E is 1,4-phenylene, 2,5-pyrimidinediyl, 5,2-pyrimidinediyl, 2,5-pyridinediyl or 5,2-pyridinediyl; or e is 1 when the ring F is 1,4-phenylene, 2,5-pyrimidinediyl, 5,2-pyrimidinediyl, 2,5-pyridinediyl or 5,2-pyridinediyl, which compound (4) is not a compound of the formula (1), (2) or (3).

In an embodiment, the liquid crystal mixture comprises at least one compound selected from the group consisting the compound of the formula (1) and the compound of the formula (2); at least one compound of the formula (3); and at least one compound of the formula (4).

In another embodiment, the liquid crystal mixture comprises at least one compound selected from the group consisting the compound of the formula (1) and the compound of the formula (2); and at least one compound of the formula (4).

According to a second aspect of the present invention, there is provided a liquid crystal device comprising a pair of electrode substrates, and a layer of the liquid crystal mixture according to the present invention present between said pair of the electrode substrates.

DETAILED DESCRIPTION OF THE INVENTION

In a first preferred embodiment of the present invention, the liquid crystal mixture comprises (a') at least one compound selected from the group consisting of a compound of the formula (5):

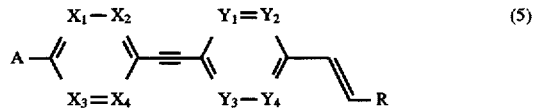

wherein R is a $C_1$–$C_{12}$ alkyl group, a $C_2$–$C_{12}$ alkenyl group or a $C_2$–$C_{16}$ alkoxyalkyl group; $X_1$, $X_2$, $X_3$, $X_4$, $Y_1$, $Y_2$, $Y_3$ and $Y_4$ represent, independently each other, CH, CF or N; and A is a hydrogen atom, a 4-$R_1$-(cycloalkyl) group, 4-$R_1$-(cycloalkenyl) group or a $R_1$—(O)$_p$ group in which $R_1$ is a $C_1$–$C_{12}$ alkyl group, a $C_2$–$C_{12}$ alkenyl group or a $C_2$–$C_{12}$ alkynyl group, and p is 0 or 1, a compound of the formula (6):

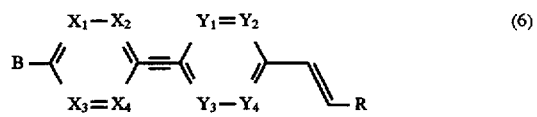

wherein B is a fluorine atom, a trifluoromethyl group, a trifluoromethoxy group or a cyano group; and R, $X_1$, $X_2$, $X_3$, $X_4$, $Y_1$, $Y_2$, $Y_3$ and $Y_4$ are the same as defined in the formula (5) and a compound of the formula (7):

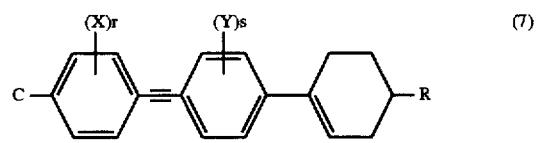

wherein C is a hydrogen atom, a fluorine atom, a trifluoromethyl group, a tifluoromethoxy group, a cyano group, a 4-$R_1$-(cycloalkyl) group, 4-$R_1$-(cycloalkenyl) group or a $R_1$—(O)$_p$ group in which $R_1$ and p are the same as defined in the formula (5); R is a $C_1$–$C_{12}$ alkyl group, a $C_2$–$C_{12}$ alkenyl group or a $C_2$–$C_{16}$ alkoxyalkyl group; X and Y represent, independently each other, a hydrogen atom or a fluorine atom; and r and s are each an integer from 0 to 3, and (b') at least one compound selected from the group consisting of a compound of the formula (8):

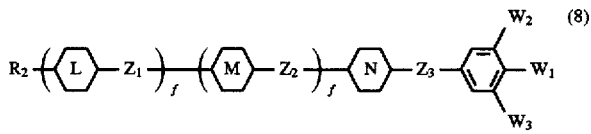

wherein $R_2$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L, M and N represent, independently each other, 1,4-phenylene, 1,4-cyclohexylene, 2,5-pyrimidinediyl, 5,2-pyrimidinediyl, 2,5-dioxanediyl or 5,2-dioxanediyl; $Z_1$, $Z_2$ and $Z_3$ represent, independently each other, —COO—, —OCO—, —OCH$_2$—, —CH$_2$O—, a $C_1$–$C_5$ alkylene group, a $C_2$–$C_5$ alkenylene group, a $C_2$–$C_5$ alkynylene group or a single bond; $W_1$ is a hydrogen atom, a fluorine atom, a fluoromethyl group, a difluoromethyl group, a trifluoromethyl group, a fluoromethoxy group, a difluoromethoxy group, a trifluoromethoxy group or a cyano group; $W_2$ and $W_3$ represent, independently each other, a hydrogen atom or a fluorine atom; and each f is 0 or 1 and a compound of the formula (9):

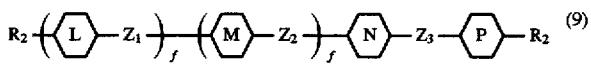

wherein each $R_2$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L, M, N and P represent, independently each other, 1,4-phenylene, 1,4-cyclohexylene, 2,5-pyrimidinediyl, 5,2-pyrimidinediyl, 2,5-dioxanediyl or 5,2-dioxanediyl; $Z_1$, $Z_2$ and $Z_3$ represent, independently each other, —COO—, —OCO—, —OCH$_2$—, —CH$_2$O—, a $C_1$–$C_5$ alkylene group, a $C_2$–$C_5$ alkenylene group, a $C_2$–$C_5$ alkynylene group or a single bond; and each f is 0 or 1.

In a second preferred embodiment of the present invention, the liquid crystal mixture comprises at least one compound selected from the group consisting of the compound of the formula (5) and the compound of the formula (6); at least one compound of the formula (7); and at least one compound selected from the group consisting of the compound of the formula (8) and the compound of the formula (9).

In a third preferred embodiment of the present invention, the liquid crystal mixture comprises at least one compound selected from the group consisting of the compound of the formula (5) and the compound of the formula (6), and at least one compound selected from the group consisting of the compound of the formula (8) and the compound of the formula (9).

In a fourth preferred embodiment of the present invention, the liquid crystal mixture comprises at least one compound selected from the group consisting of the compound of the formula (1) and the compound of the formula (2), and at least one compound of the formula (4), provided that the mixture contains at least one compound of the formula (4) in which at least one of the rings C, D, E and F is 1,4-phenylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which is substituted by 1, 2 or 3 fluorine atoms.

In a fifth preferred embodiment of the present invention, the liquid crystal mixture comprises at least one compound selected from the group consisting of the compound of the formula (1) and the compound of the formula (2), and at least one compound of the formula (4) in which the ring F is 1,4-cyclohexylene, 2,5-dioxanediyl or 5,2-dioxanediyl, each of which may be substituted by 1, 2 or 3 fluorine atoms.

In a sixth preferred embodiment of the present invention, the liquid crystal mixture comprises at least one compound selected from the group consisting of the compound of the formula (1) and the compound of the formula (2), and at least one compound of the formula (10):

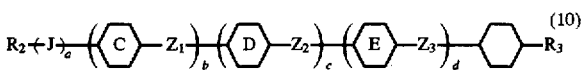

wherein the rings C, D and E, $R_2$, $R_3$, $Z_1$, $Z_2$, $Z_3$, J, a, b, c and d are the same as defined in the formula (4).

In a seventh preferred embodiment of the present invention, the liquid crystal mixture comprises at least one compound selected from the group consisting of the compound of the formula (1) and the compound of the formula (2), and at least one compound of the formula (4) in which the ring F is 1,4-phenylene, 2,5-pyrimidinediyl, 5,2-pyrimidinediyl, 2,5-pyridinediyl or 5,2-pyridinediyl, each of which may be substituted by 1, 2 or 3 fluorine atoms.

In an eighth preferred embodiment of the present invention, the liquid crystal mixture comprises at least one compound selected from the group consisting of the compound of the formula (1) and the compound of the formula (2), and at least one compound of the formula (11):

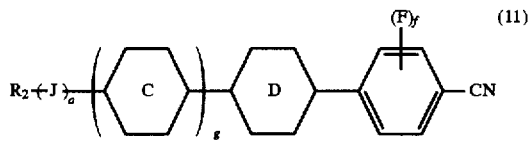

wherein $R_2$, J and the rings C and D are the same as defined in the formula (4); a and g are each 0 or 1; and f is 0, 1 or 2, provided that, when $R_2$ is an alkoxy group, a is 0, and that in the case where $R_2$ is not an alkoxy group, a is 1 when g is 1, and the ring C is 1,4-phenylene, 2,5-pyrimidinediyl, 5,2-pyrimidinediyl, 2,5-pyridinediyl or 5,2-pyridinediyl, which compound (11) is not a compound of the formula (1) or (2).

In a ninth preferred embodiment of the present invention, the liquid crystal mixture comprises at least one compound selected from the group consisting of the compound of the formula (1) and the compound of the formula (2), and at least one compound of the formula (12):

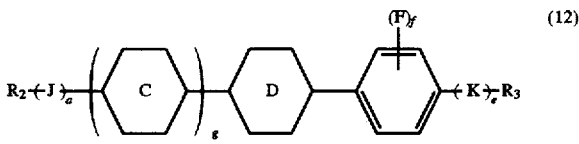

wherein $R_2$, J, the rings C and D, a, g and f are the same as defined in the formula (11); and $R_3$ and K are the same as defined in the formula (4), provided that e is 0 when $R_3$ is an alkoxy group or e is 1 when $R_3$ is not an alkoxy group, which compound (12) is not a compound of the formula (1) or (2).

In a tenth preferred embodiment of the present invention, the liquid crystal mixture comprises at least one compound selected from the group consisting of the compound of the formula (1) and the compound of the formula (2), and at least one compound selected from the group consisting of a compound of the formula (13):

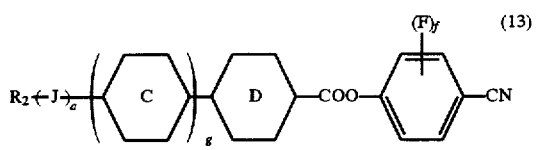

wherein $R_2$, J, the rings C and D, a, g and f are the same as defined in the formula (11), provided that a is 0 when $R_2$ is an alkoxy group, and that in the case where $R_2$ is not an alkoxy group, a is 1 when g is 1 and the ring C is 1,4-phenylene, 2,5-pyrimidinediyl, 5,2-pyrimidinediyl, 2,5-pyridinediyl or 5,2-pyridinediyl, which compound (13) is not a compound of the formula (1) or (2) and a compound of the formula (14):

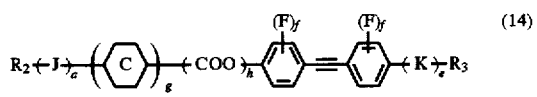

wherein $R_2$, J, the ring C, a, g, $R_3$, K, e and f are the same as defined in the formula (11); and h is 0 or 1, which compound (14) is not a compound of the formula (1) or (2).

In an eleventh preferred compound of the present invention, the liquid crystal mixture comprises at least one compound selected from the group consisting of the compound of the formula (1) and the compound of the formula (2), and at least one compound of the formula (4) in which the ring F is 1,4-cyclohexenylene, 4,1-cyclohexenylene, 2,5-cyclohexenylene, 5,2-cyclohexenylene, 3,6-cyclohexenylene, 6,3-cyclohexenylene, each of which may be substituted by 1, 2 or 3 fluorine atoms.

In a twelfth preferred embodiment of the present invention, the liquid crystal mixture comprises at least one compound selected from the group consisting of the compound of the formula (5), the compound of the formula (6) and the compound of the formula (7), and at least one compound selected from the group consisting of a compound of the formula (15):

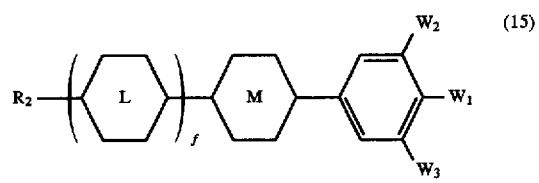

wherein $R_2$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L and M represent, independently each other, 1,4-phenylene, 1,4-cyclohexylene, 2,5-pyrimidinediyl, 5,2-pyrimidinediyl, 2,5-dioxanediyl or 5,2-dioxanediyl; $W_1$ is a hydrogen atom, a fluorine atom, a fluoromethyl group, a difluoromethyl group, a trifluoromethyl group, a fluoromethoxy group, a difluoromethoxy group, a trifluoromethoxy group or a cyano group; $W_2$ and $W_3$ represent, independently each other, a hydrogen atom or a fluorine atom; and each f is 0 or 1 and a compound of the formula (16):

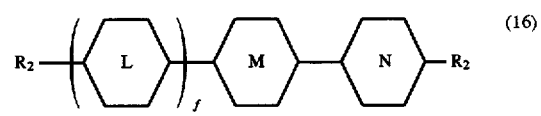

wherein each $R_2$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L, M and N represent, independently each other, 1,4-phenylene, 1,4-cyclohexylene, 2,5-pyrimidinediyl, 5,2-pyrimidinediyl, 2,5-dioxanediyl or 5,2-dioxanediyl; and each f is 0 or 1.

In a thirteenth preferred embodiment of the present invention, the liquid crystal mixture comprises at least one compound selected from the group consisting of the compound of the formula (5) and the compound of the formula (6), at least one compound of the formula (7), and at least one compound selected from the group consisting of the compound of the formula (15) and the compound of the formula (16).

In a fourteenth preferred embodiment of the present invention, the liquid crystal mixture comprises at least one compound selected from the group consisting of the compound of the formula (5) and the compound of the formula (6), and at least one compound selected from the group consisting of the compound of the formula (15) and the compound of the formula (16).

In a further preferred embodiment of the present invention, the liquid crystal device comprises a pair of electrode substrates, and at least one liquid crystal mixture selected from the above described liquid crystal mixtures present between said pair of the electrode substrates.

Now, preferred examples of the compounds to be used in the liquid crystal mixture of the present invention will be explained.

In the formulas (1) and (5), examples of the group A are methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptenyloxy, octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, 4-methylcyclohexyl, 4-ethylcyclohexyl, 4-propylcyclohexyl, 4-butylcyclohexyl, 4-pentylcyclohexyl, 4-hexylcyclohexyl, 4-heptylcyclohexyl, 4-octylcyclohexyl, 4-nonylcyclohexyl, 4-decylcyclohexyl, 4-propylcyclohexenyl, each of which may be substitued by at least one fluorine atom, a hydrogen atom, etc.

Examples of the group R are methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substiuted by at least one fluorine atom, etc.

Examples of the aromatic ring comprising the ring structure $X_1$, $X_2$, $X_3$, $X_4$, $Y_1$, $Y_2$, $Y_3$ or $Y_4$ are 1,4-phenylene, 1,4-(2-fluoro)phenylene, 1,4-(3-fluoro)phenylene, 1,4-(2,5-difluoro)-phenylene, 1,4-(3,6-difluoro)phenylene, 1,4-(2,6-difluoro)-phenylene, 1,4-(3,5-difluoro)phenylene, 2,5-pyrimidinediyl, 5,2-dipyrimidinediyl, 2,5-pyridinediyl, 5,2-pyridinediyl, etc.

Examples of the group Z are a single bond and —C≡C—.

In the formulas (2) and (6), examples of the group B are a fluorine atom, a trifluoromethyl group, a trifluoromethoxy group, and a cyano group.

Examples of the groups R and Z and the aromatic ring comprising the ring structure $X_1$, $X_2$, $X_3$, $X_4$, $Y_1$, $Y_2$, $Y_3$ or $Y_4$ are the same as those described above in connection with the formula (1).

In the formula (3), examples of the group C are the same as those described above in connection with the group A in the formula (1) or the group (B) in the formula (2). Examples of the group R and the aromatic ring comprising the ring structure $X_1$, $X_2$, $X_3$, $X_4$, $Y_1$, $Y_2$, $Y_3$ or $Y_4$ are the same as those described above in connection with the formula (1).

In the formula (7), examples of the groups C and R are the same as those described above in connection with the formula (3). X and Y are each a hydrogen atom or a fluorine atom. r and s are each an integer of 0 to 3.

Specific examples of the compound of the formula (4) are as follows. Specific examples of the compounds of the formulas (8) to (16) are included in the following compounds.

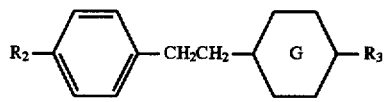

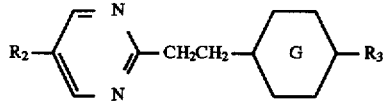

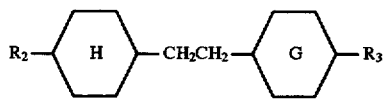

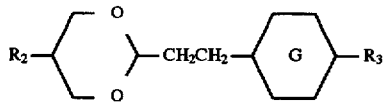

-continued

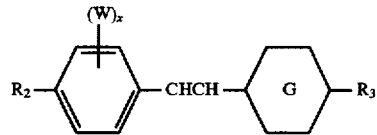

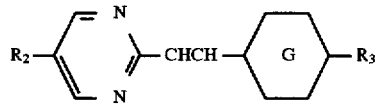

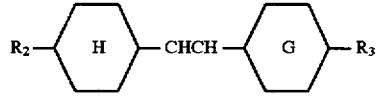

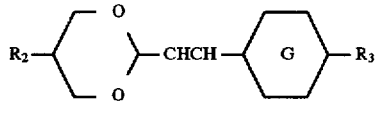

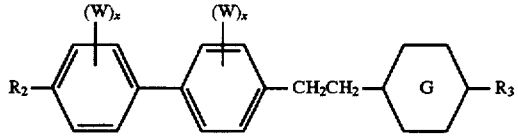

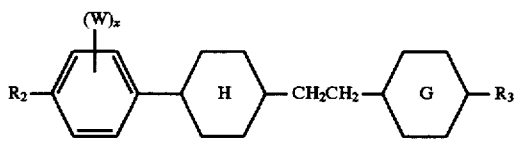

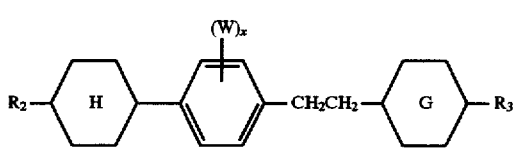

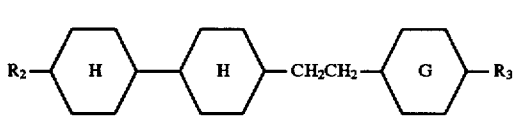

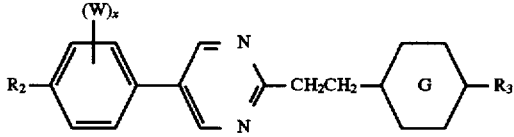

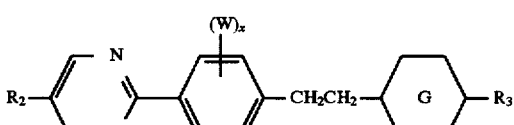

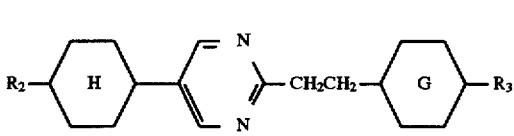

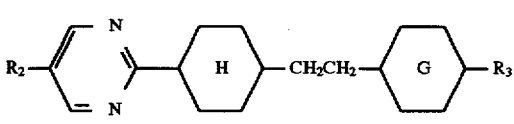

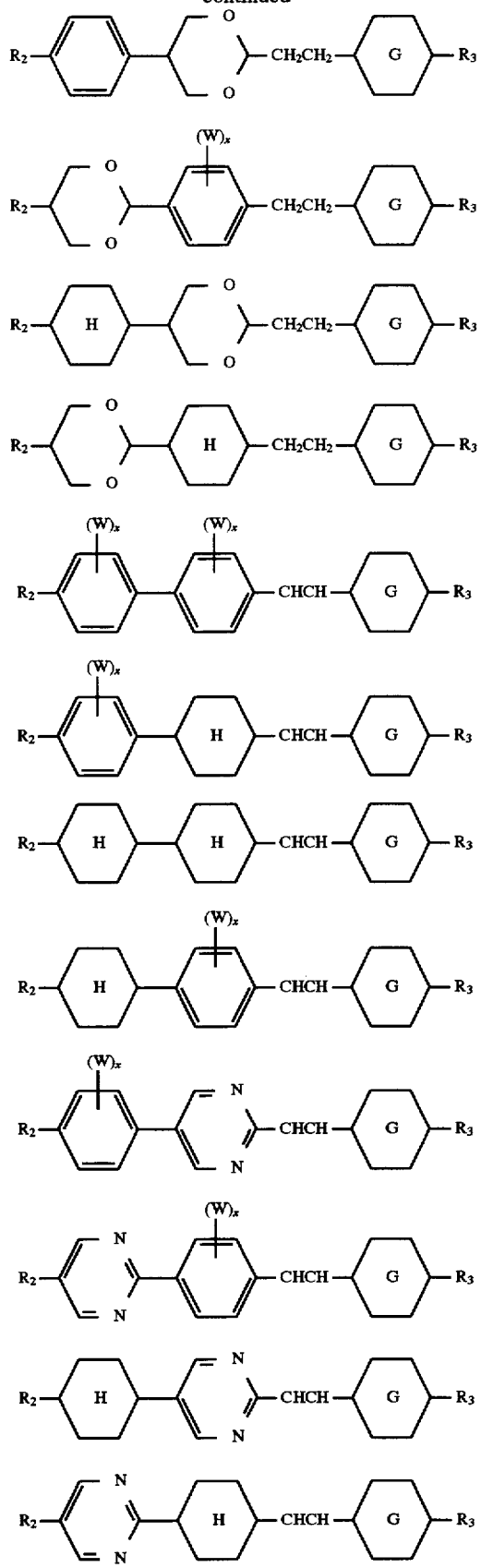
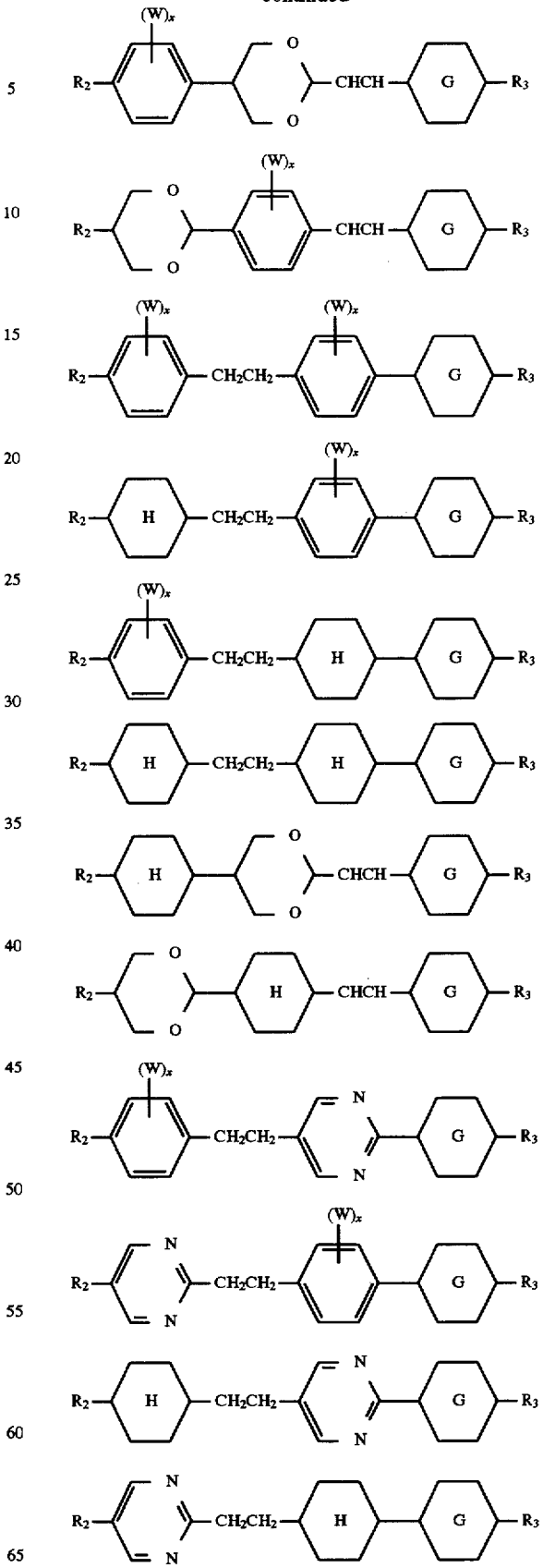

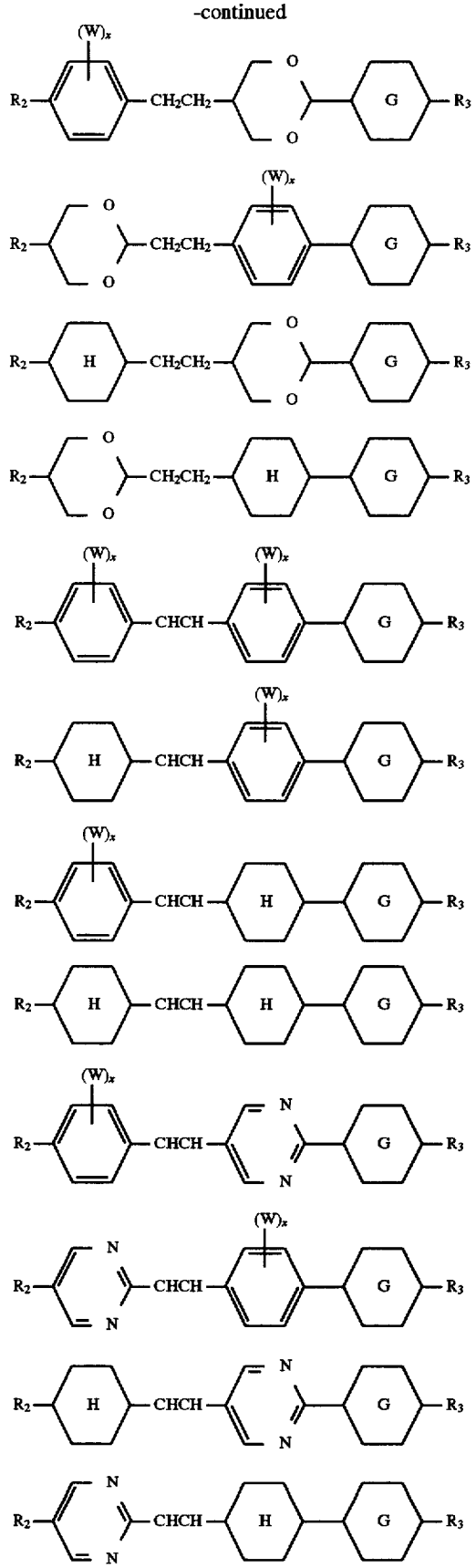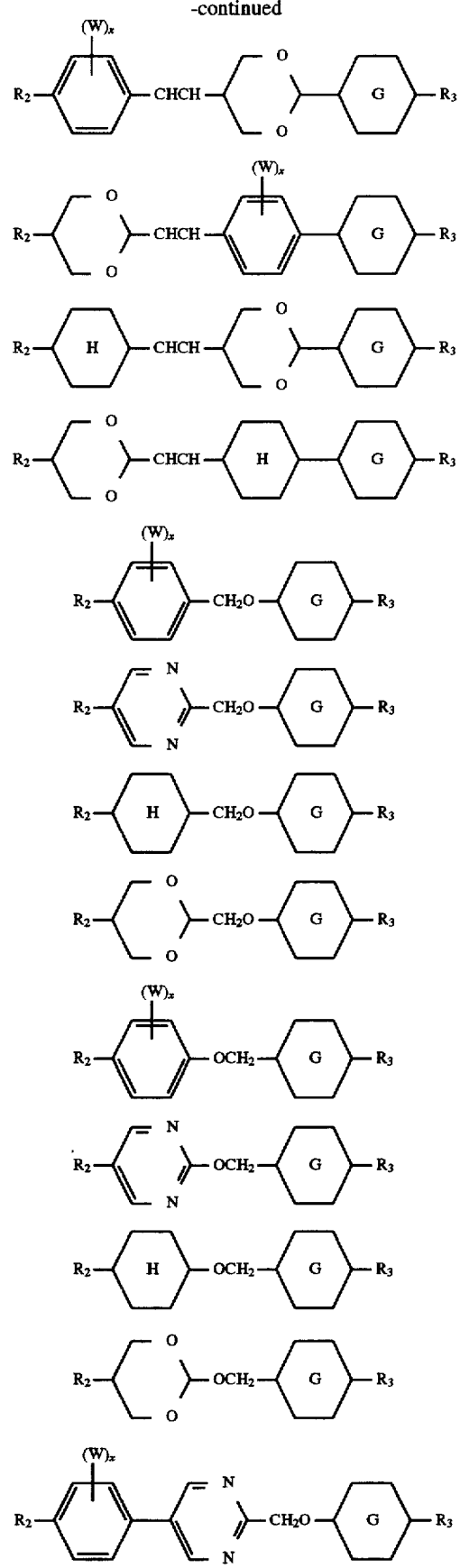

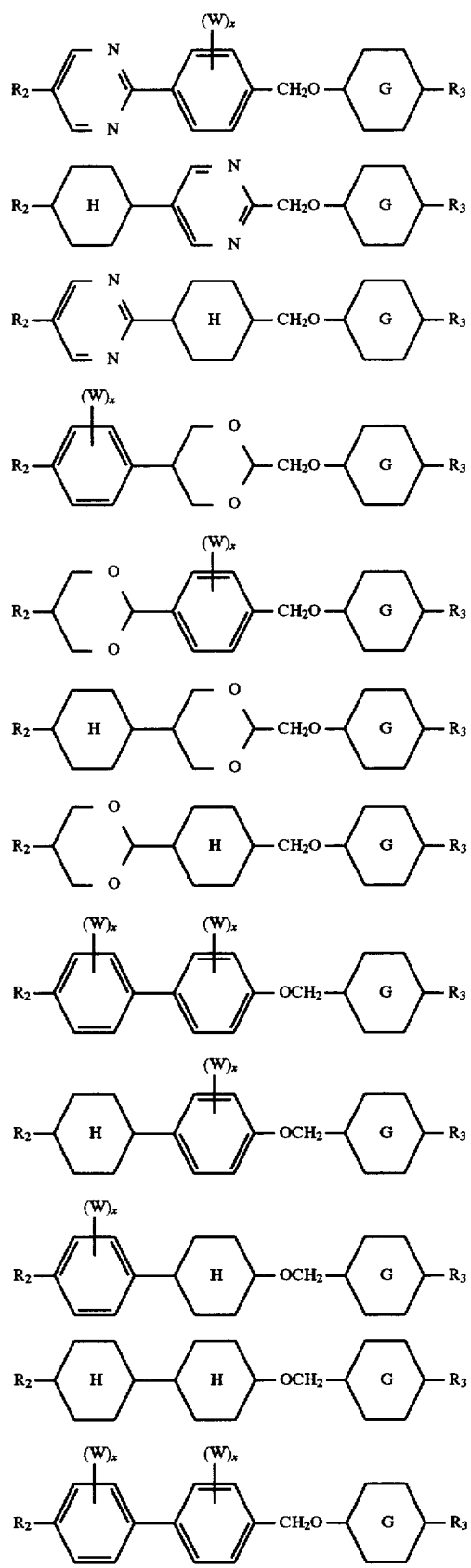
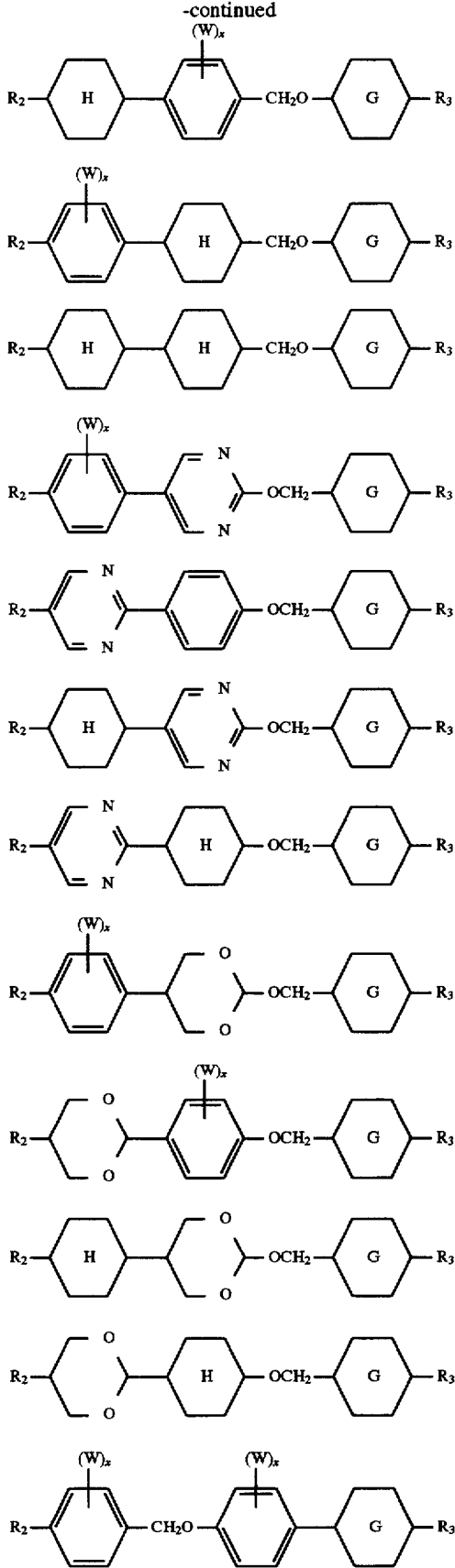

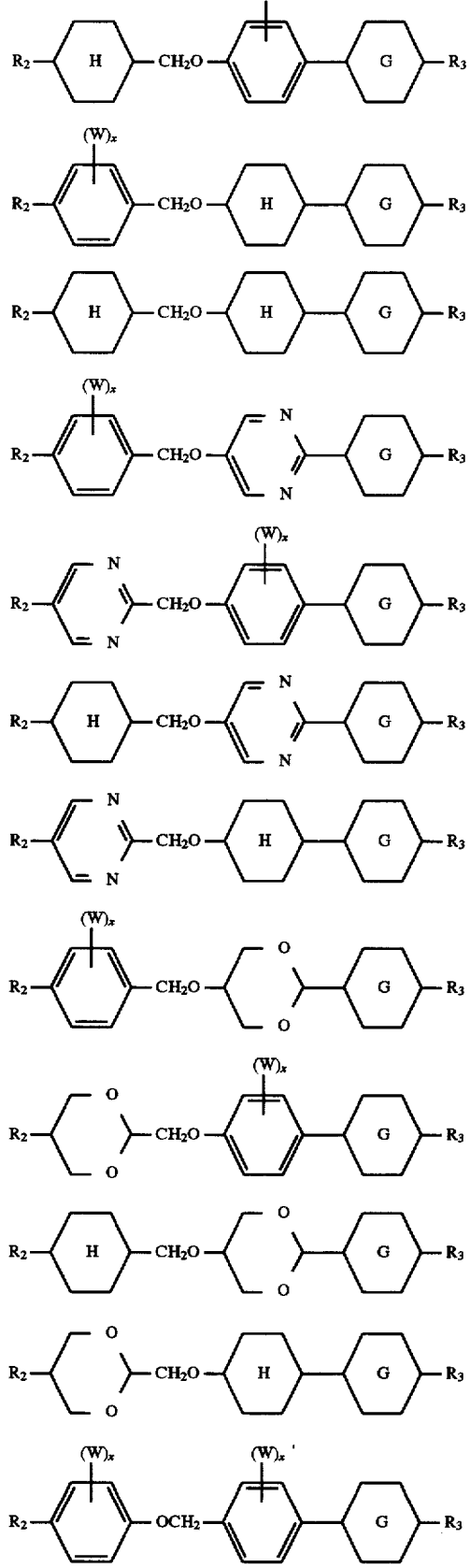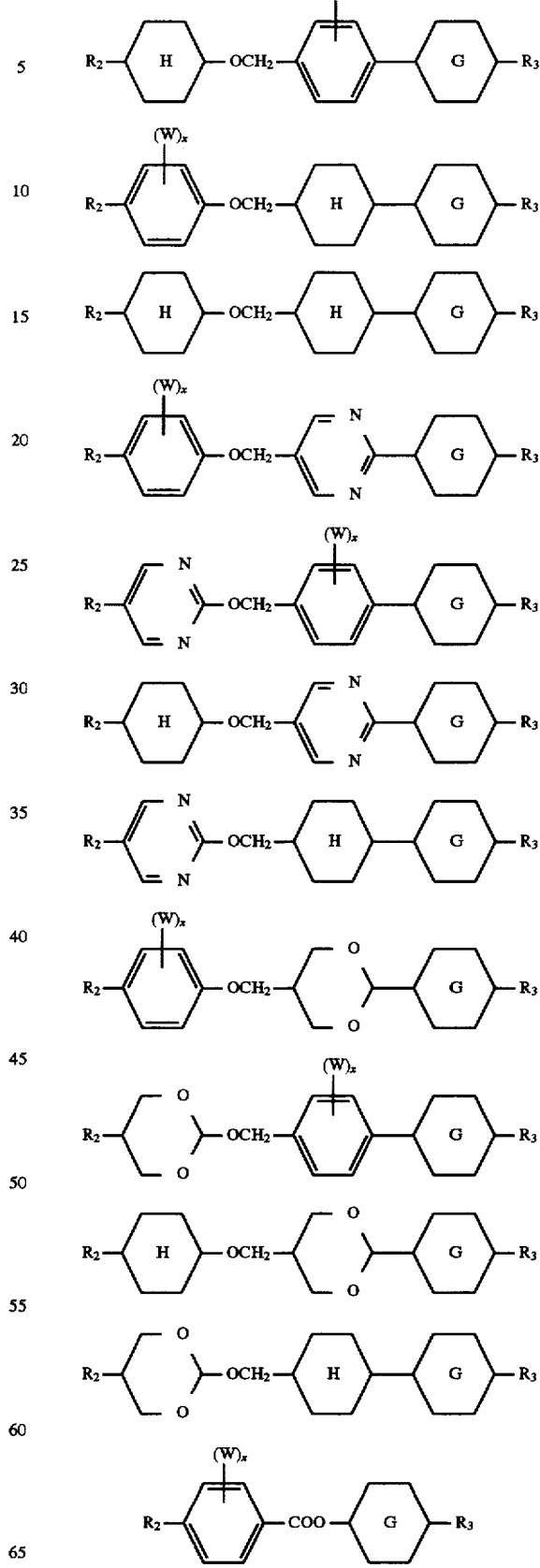

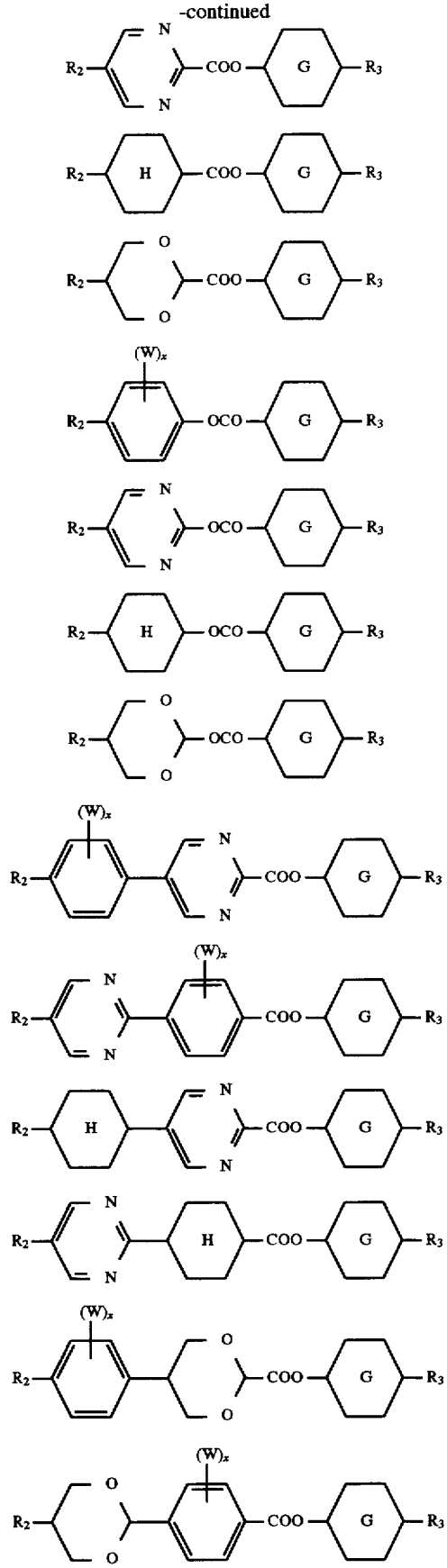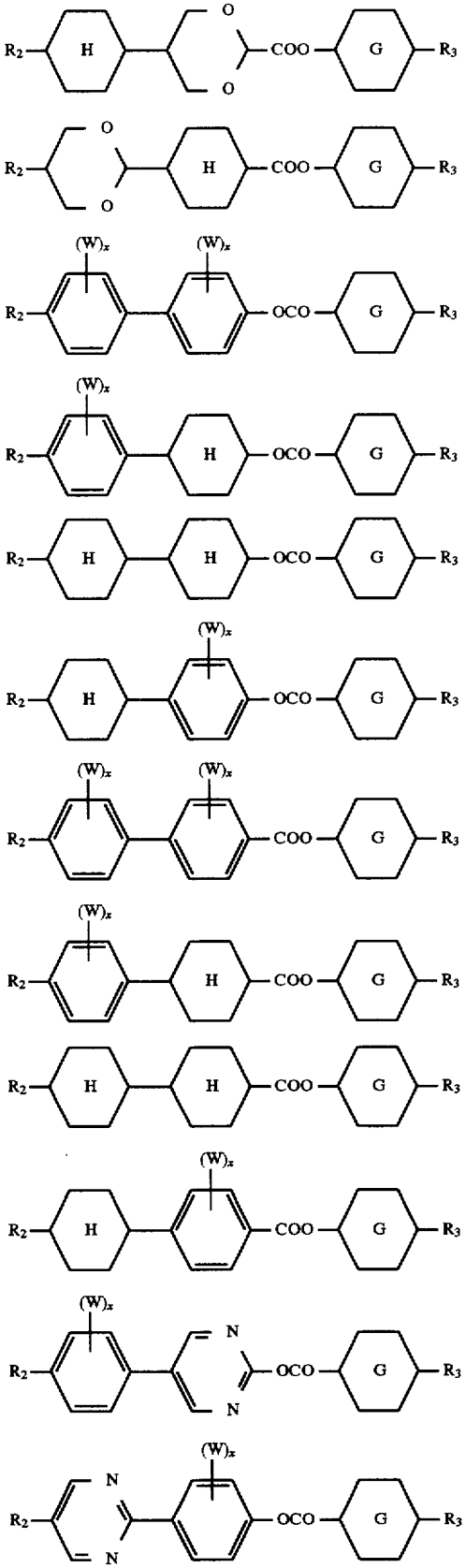

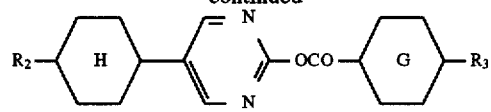
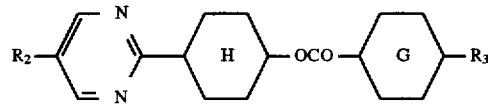
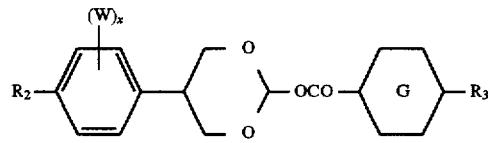
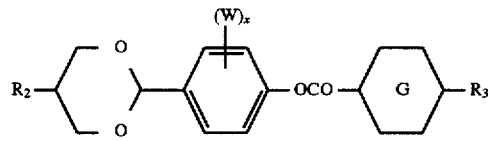
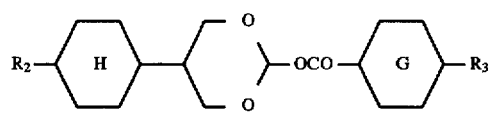
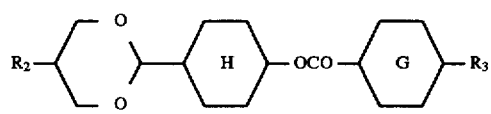
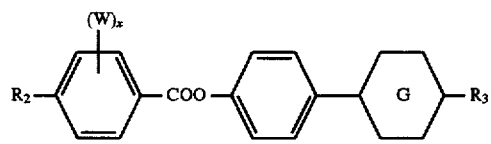
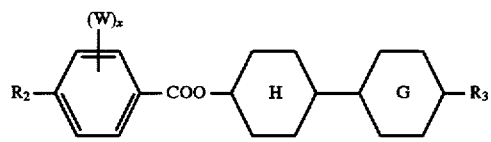
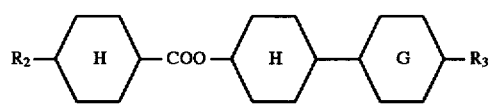
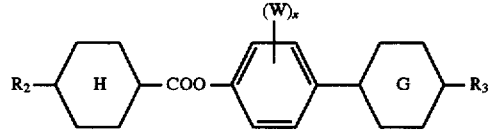
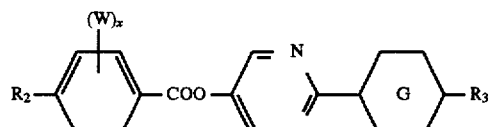
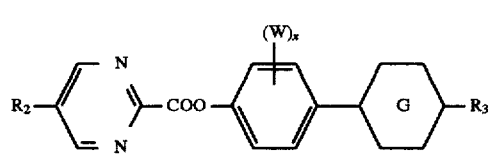
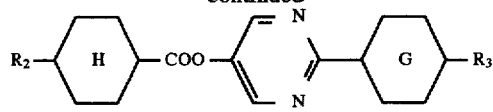
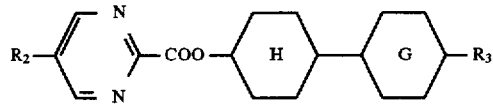
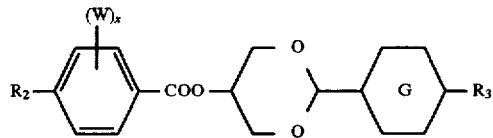
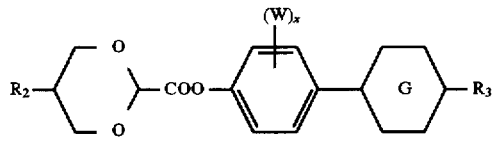
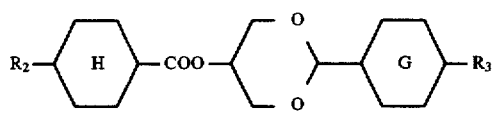
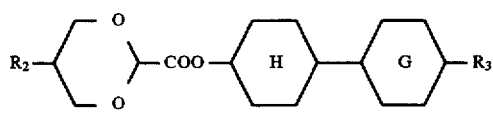
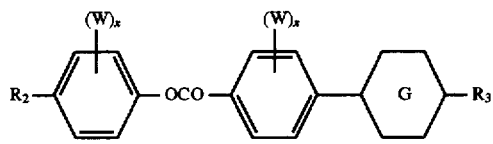
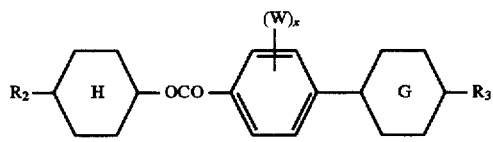
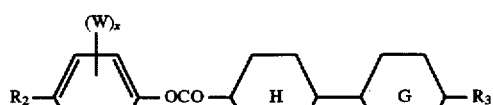
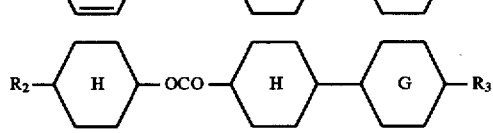
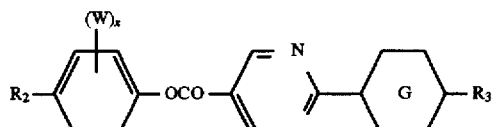
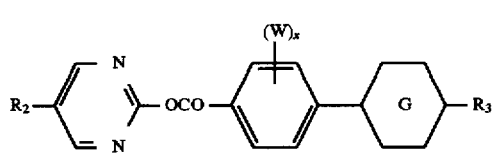

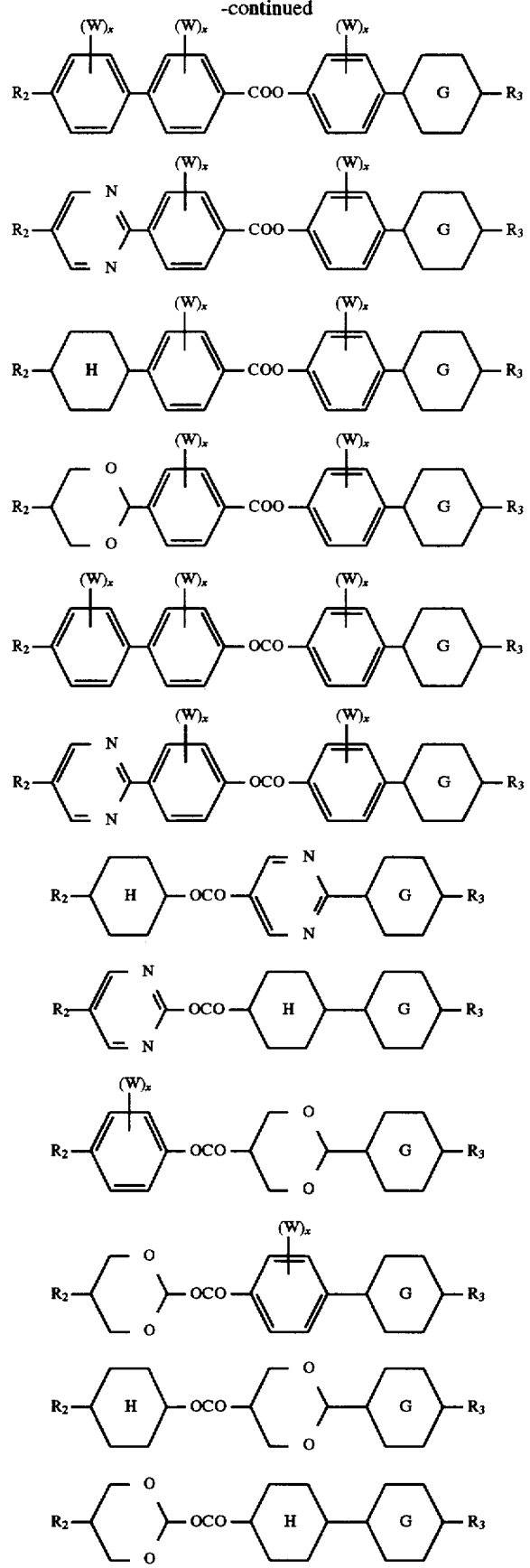
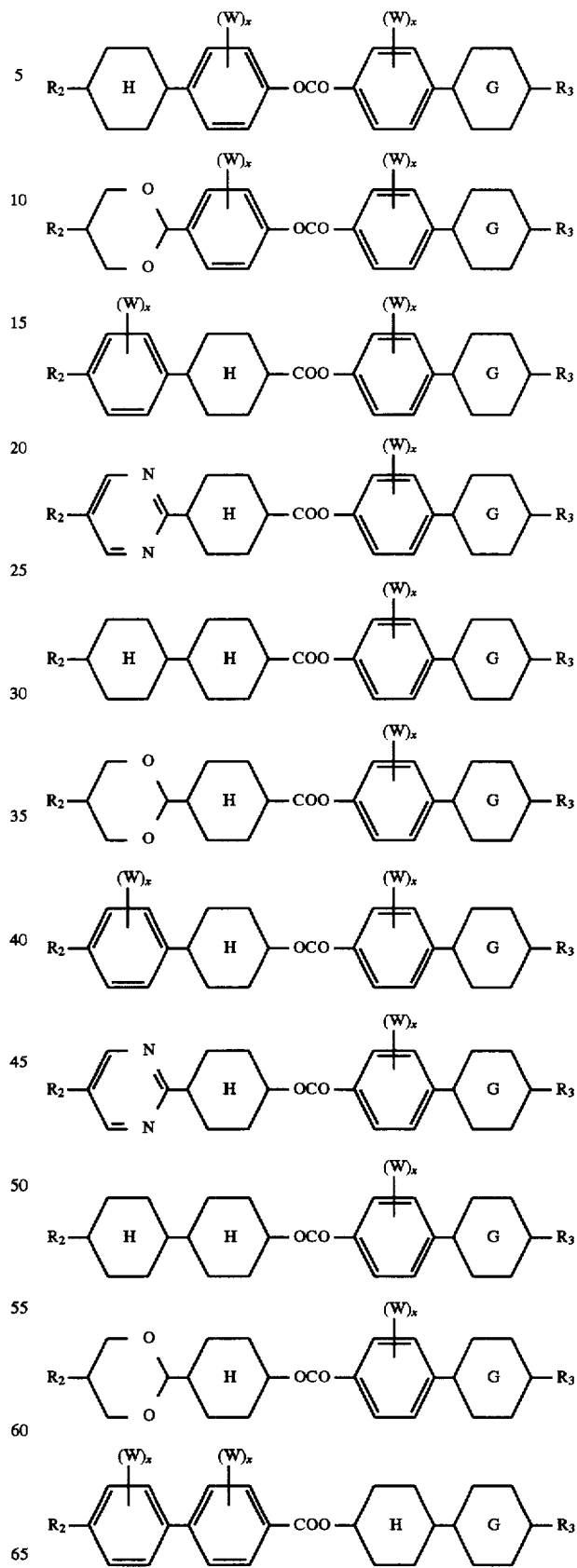

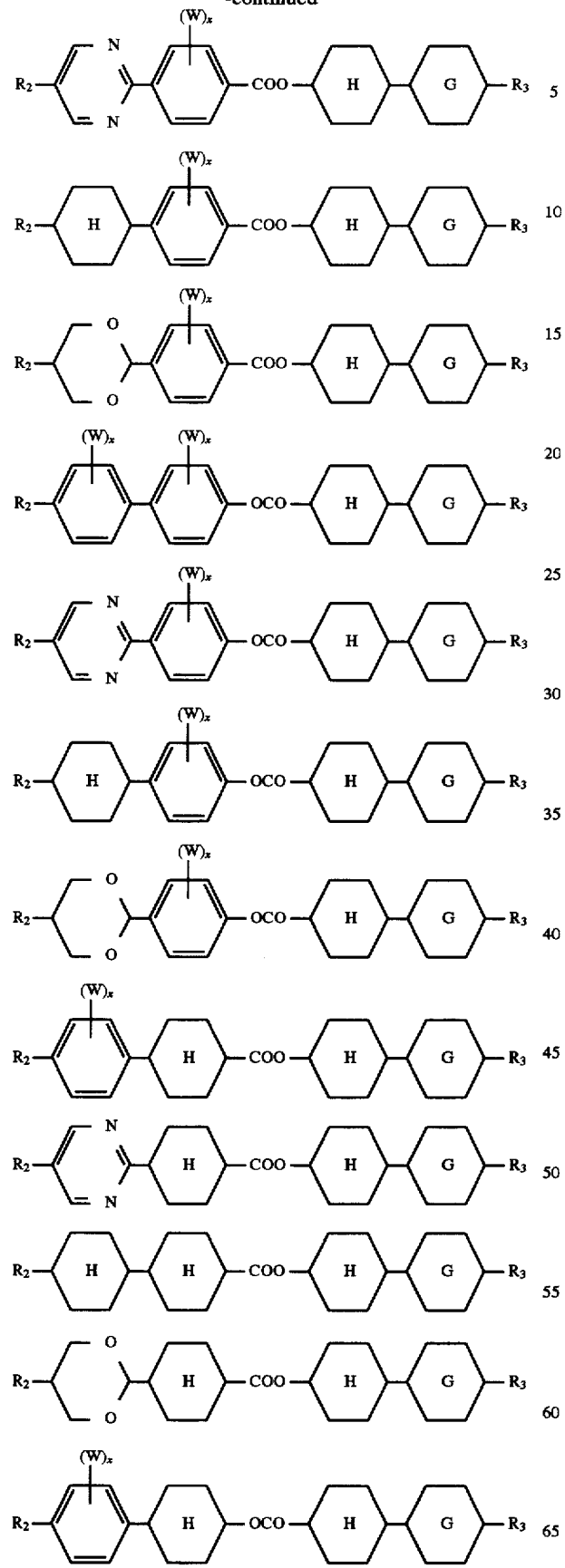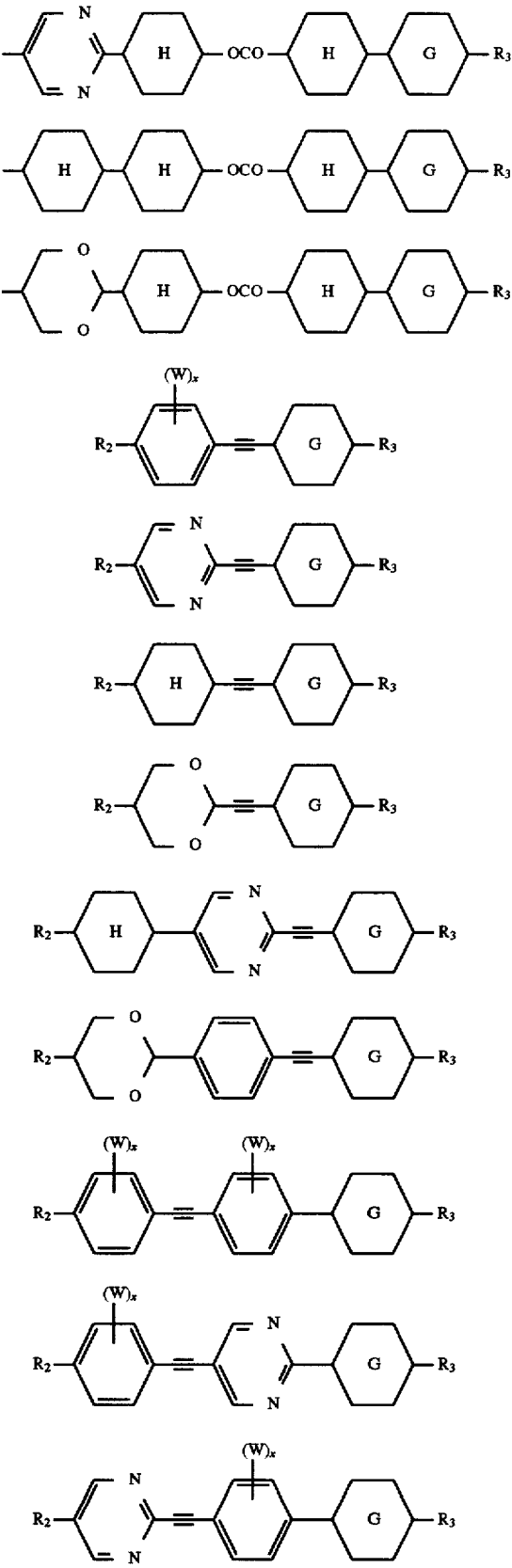

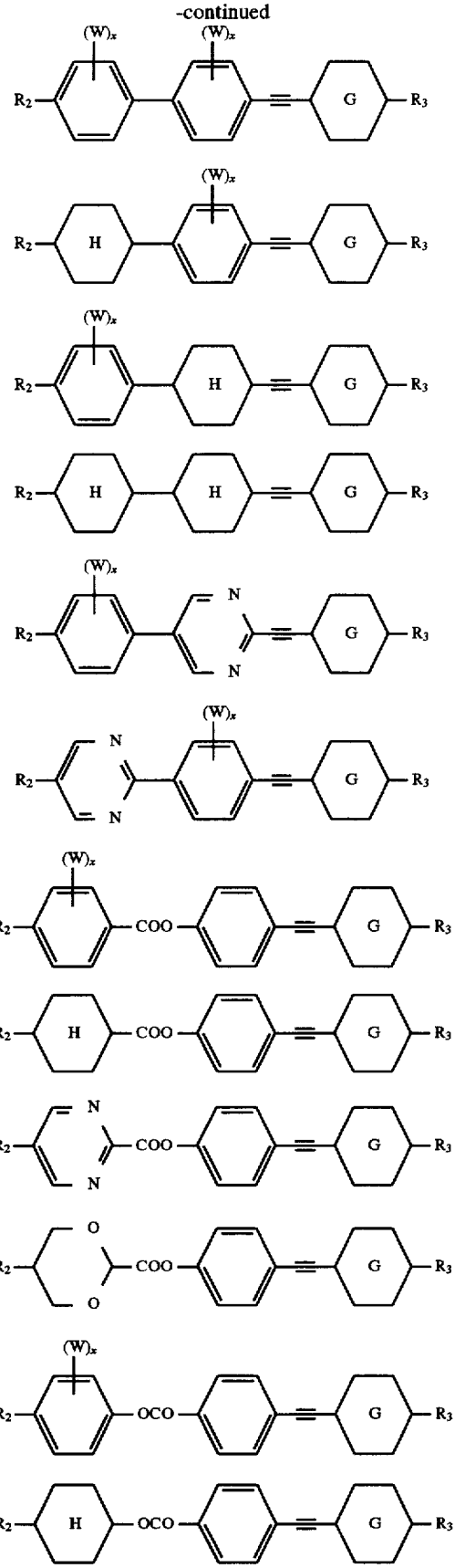
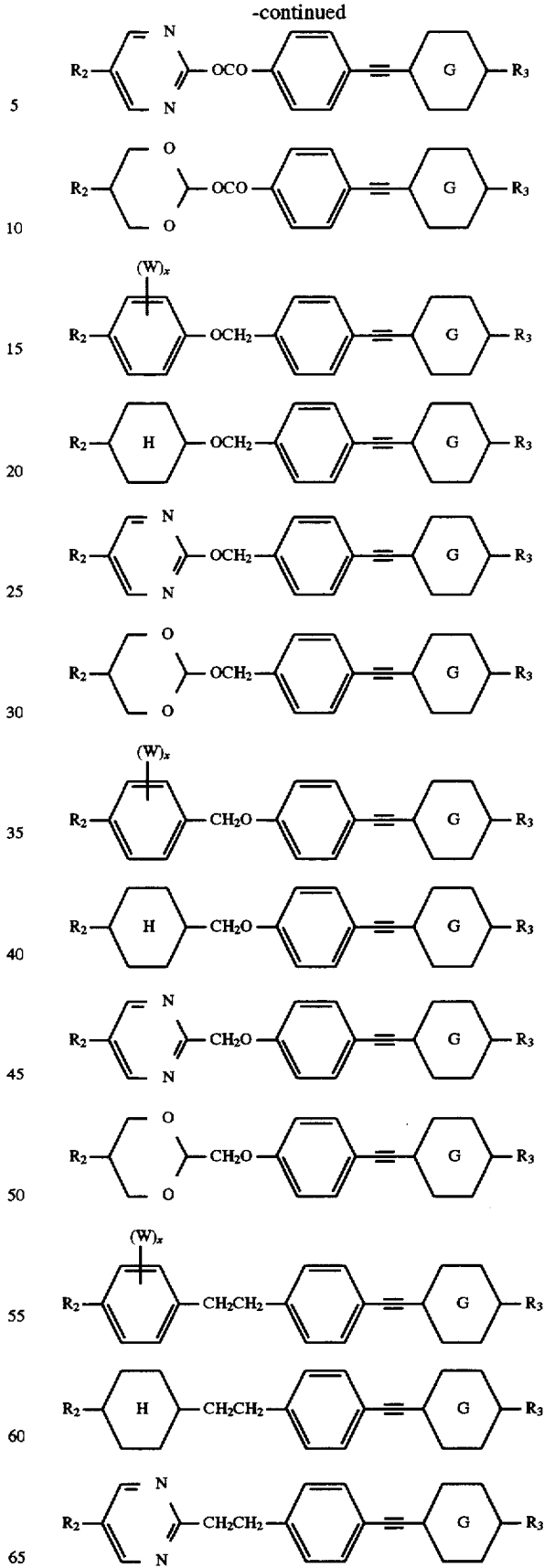

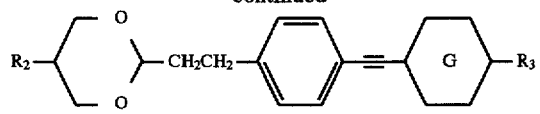
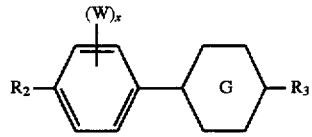
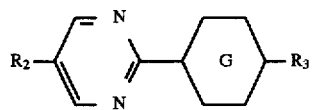
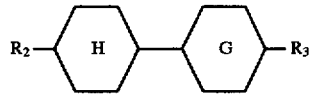
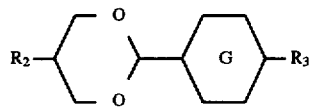
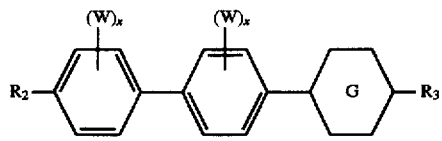
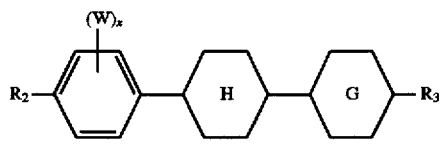
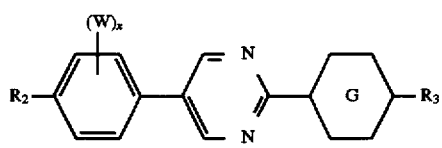
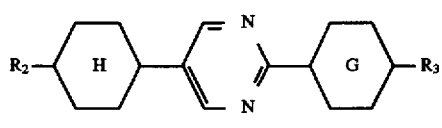
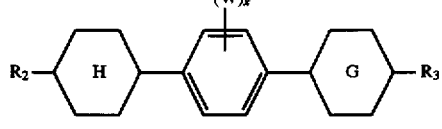
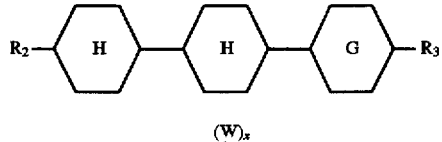
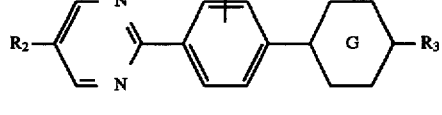
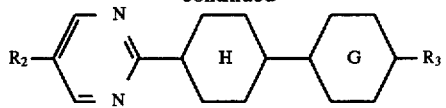
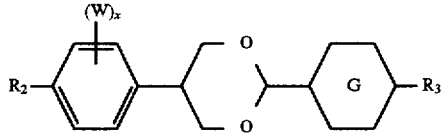
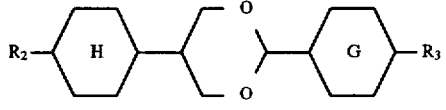
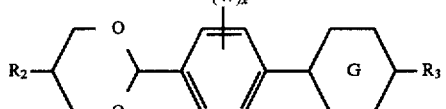
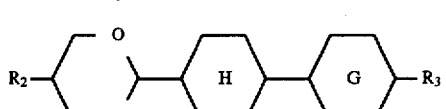
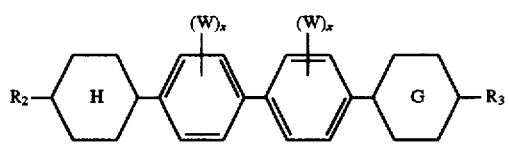
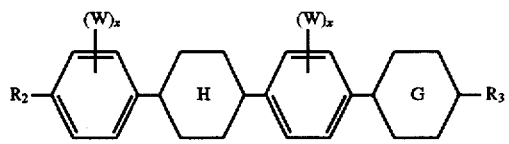
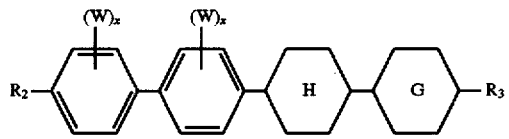
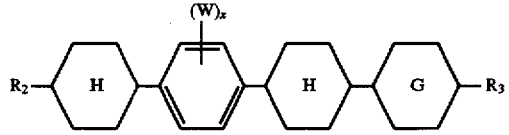
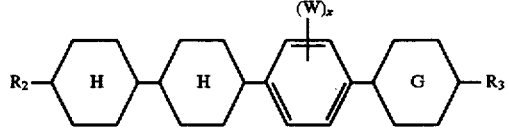
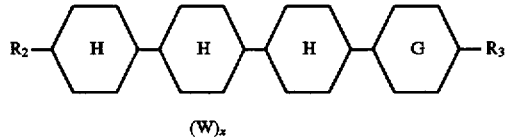
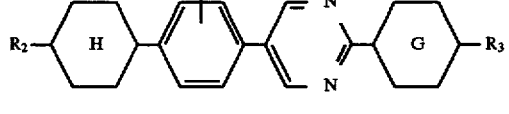

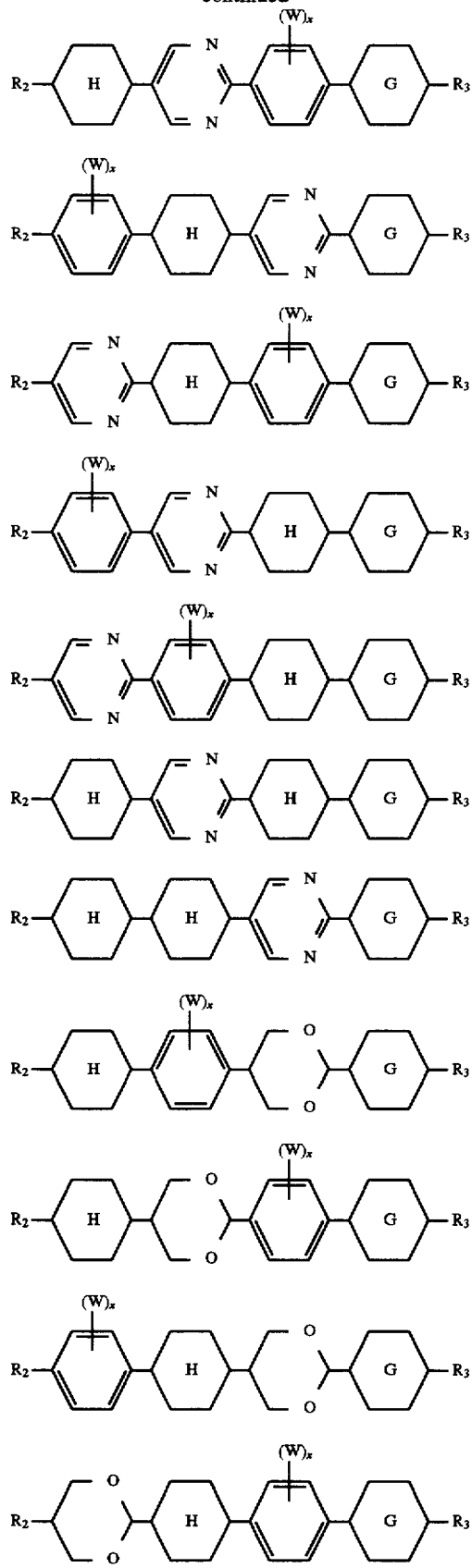
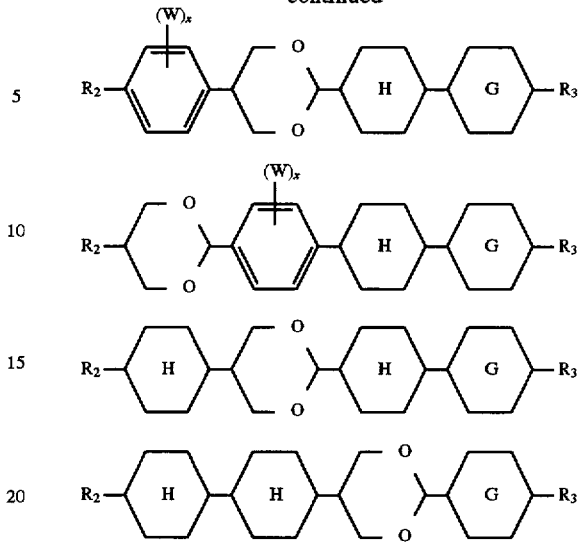

Examples of the group $R_2$ in the above exemplified compounds are a hydrogen atom, methyl, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, methoxy, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptynyloxy, octenyloxy, nonenyloxy, decenyloxy, propynyloxy, butynyloxy, pentynyloxy, hexynyloxy, heptynyloxy, octynyloxy, nonyniyloxy, decynyloxy, undecynyloxy, dodecynyloxy, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substituted by at least one fluorine atom, etc.

Examples of the group $R_3$ in the above exemplified compounds are a hydrogen atom, a fluorine atom, methyl, methoxy, a fluoromethyl group, a diflluoromethyl group, a trifluoromethyl group, a fluoromethoxy group, a difluoromethoxy group, a trifluoromethoxy group, a cyano group, ethyl, propyl, butyl, pentyl, hexyl, heptyl, octyl, nonyl, decyl, undecyl, dodecyl, ethenyl, propenyl, butenyl, pentenyl, hexenyl, heptenyl, octenyl, nonenyl, decenyl, undecenyl, dodecenyl, propynyl, butynyl, pentynyl, hexynyl, heptynyl, octynyl, nonynyl, decynyl, dodecynyl, ethoxy, propoxy, butoxy, pentyloxy, hexyloxy, heptyloxy, octyloxy, nonyloxy, decyloxy, undecyloxy, dodecyloxy, vinyloxy, propenyloxy, butenyloxy, pentenyloxy, hexynyloxy, heptenyloxy, octenyloxy, nonenyloxy, decenyloxy, propynyloxy, butynyloxy, pentynyloxy, hexynyloxy, heptynyloxy, octynyloxy, nonynyloxy, decynyloxy, undecynyloxy, dodecynyloxy, methoxymethyl, ethoxymethyl, propoxymethyl, butoxymethyl, pentyloxymethyl, hexyloxymethyl, heptyloxymethyl, octyloxymethyl, nonyloxymethyl, decyloxymethyl, methoxyethyl, ethoxyethyl, propoxyethyl, butoxyethyl, pentyloxyethyl, hexyloxyethyl, heptyloxyethyl, octyloxyethyl, nonyloxyethyl, decyloxyethyl, methoxypropyl, ethoxypropyl, propoxypropyl, butoxypropyl, pentyloxypropyl, hexyloxypropyl, heptyloxypropyl, octyloxypropyl, nonyloxypropyl, decyloxypropyl, methoxybutyl, ethoxybutyl, propoxybutyl, butoxybutyl, pentyloxybutyl, hexyloxybutyl, heptyloxybutyl, octyloxybutyl, nonyloxybutyl, decyloxybutyl, methoxypentyl, ethoxypentyl, propoxypentyl, butoxypentyl, pentyloxypentyl, hexyloxypentyl, heptyloxypentyl, octyloxypentyl, nonyloxypentyl, decyloxypentyl, each of which may be substituted by at least one fluorine atom, etc.

W is a hydrogen atom or a fluorine atom, and x is an integer of 0 to 3.

The group of the formula:

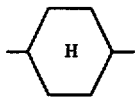

represents 1,4-cyclohexylene, and the group of the formula:

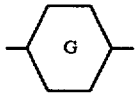

represents 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which may be substituted by 1, 2 or 3 fluorine atoms.

More preferably, the ring G is 1,4-phenylene, 1,4-cyclohexylene, 1,4-cyclohexenylene, 4,1-cyclohexenylene, 2,5-cyclohexenylene, 5,2-cyclohexenylene, 3,6-cyclohexenylene, 6,3-cyclohexenylene, each of which may be substituted by 1, 2 or 3 fluorine atoms.

In the formulas (8), (9), (15) and (16), the group $W_1$ represents a hydrogen atom, a fluorine atom, a fluoromethyl group, a difluoromethyl group, a trifluoromethyl group, a fluoromethoxy group, a difluoromethoxy group, a trifluoromethoxy group or a cyano group, and $W_2$ and $W_3$ represent, independently each other, a hydrogen atom or a fluorine atom. $Z_1$, $Z_2$ and $Z_3$ represent, independently each other, —COO—, —OCO—, OCH$_2$—, —CH$_2$O—, a $C_1$-$C_5$ alkylene group, a $C_2$-$C_5$ alkenylene group, a $C_2$-$C_5$ alkynylene group or a single bond. The rings L, M, N and P represent, independently each other, 1,4-phenylene, 1,4-cyclohexylene, 4,1-cyclohexenylene, 2,5-pyrimidinediyl, 5,2-pyrimidinediyl, 2,5-dioxanediyl or 5,2-dioxanediyl, more preferably 1,4-phenylene, 1,4-cyclohexylene and 4,1-cyclohexelene.

Each of the liquid crystal mixture of the present invention may contain at least one chiral compound as a twisting agent. A kind of the chiral compound is not limited, and preferred examples thereof are as follows:

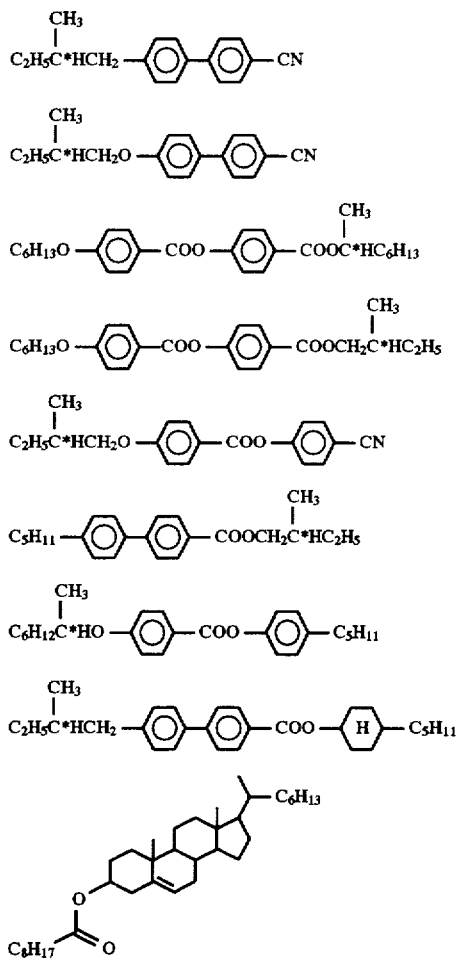

EXAMPLES

The present invention will be illustrated by the following Examples, which do not limit the scope of the present invention in any way.

The properties of the liquid crystal mixture are measured by the following methods:

Anisotropy of refractive index (Δn) is determined by measuring a retardation by the Senarmont method at a wavelength of 589 nm.

Anisotropy of dielectric constant (Δε), which is a difference between a dielectric constant in a longer axis direction and that in a shorter axis direction of a liquid crystal molecule, is determined by measuring an electrostatic capacity of a liquid crystal mixture as follows:

An amount of a liquid crystal mixture is placed in a homogeneously orientated cell having a pair of transparent electrodes, and an electrostatic capacity is measured while applying an voltage on the cell. The dielectric constant in the longer axis direction of the liquid crystal molecule is calculated from an electrostatic capacity at the infinite applied voltage according to the following equation (2):

$$\epsilon \times \epsilon_0 = C \times d/s \qquad (2)$$

wherein $\epsilon_0$ is the dielectric constant of vacuum, C is an electrostatic capacity, d is a thickness of the cell, and s is an area of an electrode.

The electrostatic capacity at the infinite applied voltage is obtained by plotting the electrostatic capacities against the reciprocal of the applied voltages and extrapolating the plots.

The dielectric constant in the shorter axis direction of the liquid crystal molecule is obtained from an electrostatic capacity at a voltage lower than the threshold voltage in the similar way.

Then, the anisotropy of dielectric constant ($\Delta\epsilon$) is obtained as a difference between the two dielectric constants.

An upper limit temperature (TNI) (°C.) of a nematic phase of the liquid crystal mixture is obtained by observing a transparent point with raising the temperature by a polarized light microscope.

A viscosity of a liquid crystal mixture is measured using a falling ball viscometer (AMV-200 manufactured by Anton PAAR).

Example 1

As compounds of the formula (4) or (8) or (11) or (15), the compounds (4-1) to (4-4) were mixed in the following ratios to prepare Mixture A.

| Components of Mixture A | | Mole % |
|---|---|---|
| Compound (4-1) | $C_3H_7$—(H)—(  )—CN | 24 |
| Compound (4-2) | $C_5H_{11}$—(H)—(  )—CN | 36 |
| Compound (4-3) | $C_7H_{15}$—(H)—(  )—CN | 25 |
| Compound (4-4) | $C_5H_{11}$—(H)—(  )—(  )—CN | 15 |

To Mixture A, the following compound (1-1), which is an example of the compound of the formula (1) or (5), was added in the following ratios to prepare Mixture B.

| Components of Mixture B | | Mole % |
|---|---|---|
| Compound (1-1) | $C_3H_7$—(  )=(  )—$C_3H_7$ | 15 |
| Mixture A | | 85 |

The anisotropies of refractive index ($\Delta n$) of Mixtures B and A were 0.167 and 0.136, respectively.

As seen from these values, the liquid crystal mixture of the present invention had the larger anisotropies of refractive index.

Example 2

To Mixture A prepared in Example 1, the following compound (1-2), which is an example of the compound of the formula (1) or (5), was added in the following ratios to prepare Mixture C.

| Components of Mixture C | | Mole % |
|---|---|---|
| Compound (1-2) | $C_3H_7$—(H)—(  )=(  )—$C_3H_7$ | 15 |
| Mixture A | | 85 |

The anisotropies of refractive index ($\Delta n$) and the upper limit temperatures (TNI) of the nematic phase of Mixtures A and C were as follows:

| Mixture | $\Delta n$ | TNI |
|---|---|---|
| Mixture C | 0.169 | 95 |
| Mixture A | 0.136 | 72 |

As seen from the above values, the liquid crystal mixture of the present invention had the larger anisotropy of refractive index and also the higher TNI.

Example 3

To Mixture A prepared in Example 1, the following compound (2-1), which is an example of the compound of the formula (2) or (6), was added in the following ratios to prepare Mixture D.

| Components of Mixture D | | Mole % |
|---|---|---|
| Compound (2-1) | F—(  )=(  )—$C_3H_7$ | 15 |
| Mixture A | | 85 |

The anisotropies of refractive index ($\Delta n$) of Mixtures D and A were 0.164 and 0.136, respectively.

As seen from these values, the liquid crystal mixture of the present invention had the larger anisotropy of refractive index.

Example 4

To Mixture A prepared in Example 1, the following compound (2-2), which is an example of the compound of the formula (2) or (6), was added in the following ratios to prepare Mixture E.

| Components of Mixture E | | Mole % |
|---|---|---|
| Compound (2-2) | NC—(  )=(  )—$C_3H_7$ | 15 |
| Mixture A | | 85 |

The anisotropies of refractive index ($\Delta n$) and the anisotropy of dielectric constant ($\Delta\epsilon$) of Mixtures A and E were as follows:

| Mixture | Δn | Δε |
| --- | --- | --- |
| Mixture E | 0.194 | 13 |
| Mixture A | 0.136 | 11.8 |

As seen from the above values, the liquid crystal mixture of the present invention had the larger anisotropy of refractive index and also the larger anisotropy of dielectric constant.

Example 5

To Mixture A prepared in Example 1, the following compound (2-3), which is an example of the compound of the formula (2) or (6), was added in the following ratios to prepare Mixture F.

| Components of Mixture F | Mole % |
| --- | --- |
| Compound (2-3) F—⟨⟩=⟨⟩—C₃H₇ (with F substituent) | 15 |
| Mixture A | 85 |

The anisotropies of refractive index (Δn) of Mixtures F and A were 0.153 and 0.136, respectively.

As seen from these values, the liquid crystal mixture of the present invention had the larger anisotropy of refractive index.

Example 6

To Mixture A prepared in Example 1, the following compound (2-4), which is an example of the compound of the formula (2) or (6), was added in the following ratios to prepare Mixture G.

| Components of Mixture G | Mole % |
| --- | --- |
| Compound (2-4) F,F,F—⟨⟩=⟨⟩—C₃H₇ | 15 |
| Mixture A | 85 |

The anisotropies of refractive index (Δn) of Mixtures G and A were 0.141 and 0.136, respectively.

As seen from these values, the liquid crystal mixture of the present invention had the larger anisotropy of refractive index.

Example 7

To Mixture A prepared in Example 1, the following compound (2-5), which is an example of the compound of the formula (2) or (6), was added in the following ratios to prepare Mixture H.

| Components of Mixture H | Mole % |
| --- | --- |
| Compound (2-5) NC—⟨F⟩=⟨⟩—C₃H₇ | 15 |
| Mixture A | 85 |

The anisotropies of refractive index (Δn) and the anisotropy of dielectric constant (Δε) of Mixtures A and H were as follows:

| Mixture | Δn | Δε |
| --- | --- | --- |
| Mixture H | 0.176 | 13.9 |
| Mixture A | 0.136 | 11.8 |

As seen from the above values, the liquid crystal mixture of the present invention had the larger anisotropy of refractive index and also the larger anisotropy of dielectric constant.

Example 8

The compound (4-1), which is an example of the compound of the formula (4) or (8) or (11) or (15), and the compounds (4-6) and (4-7), which are examples of the compound of the formula (4) or (9) or (10) or (12), were mixed in the following ratios to prepare Mixture J.

| Components of Mixture J | Mole % |
| --- | --- |
| Compound (4-1) C₃H₇—⟨H⟩—⟨⟩—CN | 25.6 |
| Compound (4-6) C₃H₇—⟨H⟩—⟨⟩—OC₂H₅ | 31.2 |
| Compound (4-7) C₃H₇—⟨H⟩—⟨H⟩—C₄H₉ | 43.2 |

To Mixture J, the following compound (2-2), which is an example of the compound of the formula (2) or (6), was added in the following ratios to prepare Mixture K.

| Components of Mixture K | Mole % |
| --- | --- |
| Compound (2-2) NC—⟨⟩=⟨⟩—C₃H₇ | 20 |
| Mixture J | 80 |

The anisotropies of refractive index (Δn) of Mixtures K and J were 0.137 and 0.066, respectively.

As seen from these values, the liquid crystal mixture of the present invention had the larger anisotropy of refractive index.

Example 9

The compounds (4-1), (4-8) and (4-9), which are examples of the compound of the formula (4) or (8) or (11) or (15), were mixed in the following ratios to prepare Mixture L.

| Components of Mixture L | | Mole % |
|---|---|---|
| Compound (4-1) | C₃H₇—(H)—(—)—CN | 12.4 |
| Compound (4-8) | \_/—(H)—(—)—CN | 43.8 |
| Compound (4-9) | ⁼\_/—(H)—(—)—CN | 43.8 |

To Mixture L, the following compound (2-2), which is an example of the compound of the formula (2) or (6), was added in the following ratios to prepare Mixture M.

| Components of Mixture M | | Mole % |
|---|---|---|
| Compound (2-2) | NC—(—)=(—)—\_C₃H₇ | 20 |
| Mixture L | | 80 |

The anisotropies of refractive index ($\Delta n$) of Mixtures M and L were 0.223 and 0.165, respectively.

As seen from these values, the liquid crystal mixture of the present invention had the larger anisotropy of refractive index.

Example 10

The compounds (4-8) and (4-9), which are examples of compound of the formula (4) or (8) or (11) or (15), were mixed in the following ratios to prepare Mixture N.

| Components of Mixture N | | Mole % |
|---|---|---|
| Compound (4-8) | \_/—(H)—(—)—CN | 50 |
| Compound (4-9) | ⁼\_/—(H)—(—)—CN | 50 |

To Mixture N, the following compound (1-1), which is an example of the compound of the formula (1) or (5), and the following compound (2-1), which is an example of the compound of the formula (2) or (6), were added in the following ratios to prepare Mixture 0.

| Components of Mixture O | | Mole % |
|---|---|---|
| Compound (1-1) | C₃H₇—(—)=(—)—\_C₃H₇ | 20 |
| Compound (2-1) | F—(—)=(—)—\_C₃H₇ | 20 |
| Mixture N | | 60 |

The anisotropies of refractive index ($\Delta n$) of Mixtures O and N were 0.186 and 0.157, respectively.

As seen from these values, the liquid crystal mixture of the present invention had the larger anisotropy of refractive index.

Example 11

The compounds (4-6) and (4-7), which are examples of the compound of the formula (4) or (9) or (10) or (12) or (16), were mixed in the following ratios to prepare Mixture P.

| Components of Mixture P | | Mole % |
|---|---|---|
| Compound (4-6) | C₃H₇—(H)—(—)—OC₂H₅ | 42.0 |
| Compound (4-7) | C₃H₇—(H)—(H)—C₄H₉ | 58.0 |

To Mixture P, the following compounds (1-3), (1-4) and (1-5), which are examples of the compound of the formula (1) or (5), were added in the following ratios to prepare Mixture Q.

| Components of Mixture Q | | Mole % |
|---|---|---|
| Compound (1-3) | C₃H₇—(—)=(—F)—\_C₃H₇ | 15.6 |
| Compound (1-4) | C₃H₇—(—)=(—F)—\_C₃H₇ | 10.4 |
| Compound (1-5) | C₃H₇—(—)—(—)=(—F)—\_C₃H₇ | 14.0 |
| Mixture P | | 60.0 |

The anisotropies of refractive index ($\Delta n$) of Mixtures P and Q were 0.058 and 0.184, respectively.

As seen from these values, the liquid crystal mixture of the present invention had the larger anisotropy of refractive index.

Example 12

To Mixture P prepared in Example 11, the following compounds (1-3), (1-4) and (1-5), which are examples of the compound of the formula (1) or (5), and the compounds (2-5) and (2-6), which are examples of the formula (2) or (6), were added in the following ratios to prepare Mixture R.

| Components of Mixture R | | Mole % |
|---|---|---|
| Compound (1-3) | C₃H₇—(—)=(—F)—\_C₃H₇ | 12.5 |
| Compound (1-4) | C₃H₇—(—)=(—F)—\_C₃H₇ | 8.3 |
| Compound (1-5) | C₃H₇—(—)—(—)=(—F)—\_C₃H₇ | 11.2 |

| Components of Mixture R | | Mole % |
|---|---|---|
| Compound (2-5) | 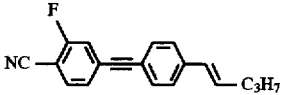 | 3.2 |
| Compound (2-6) | 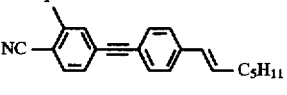 | 4.8 |
| Mixture P | | 60.0 |

The anisotropies of refractive index ($\Delta n$) of Mixtures P and R were 0.058 and 0.181, respectively.

As seen from these values, the liquid crystal mixture of the present invention had the larger-anisotropy of refractive index.

Example 13

To Mixture P prepared in Example 11, the following compound (4-5), which is an example of the compound of the formula (4) or (8) or (11) or (15), was added in the following ratios to prepare Mixture S.

| Components of Mixture S | | Mole % |
|---|---|---|
| Compound (4-5) | 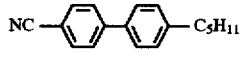 | 32.5 |
| Mixture P | | 67.5 |

To Mixture S, the following compound (1-5), which is an example of the compound of the formula (1) or (5) was added in the following ratios to prepare Mixture T.

| Components of Mixture T | | Mole % |
|---|---|---|
| Compound (1-5) | 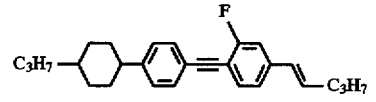 | 11.0 |
| Mixture S | | 89.0 |

The anisotropies of refractive index ($\Delta n$) of Mixtures S and T were 0.102 and 0.139, respectively.

As seen from these values, the liquid crystal mixture of the present invention had the larger anisotropy of refractive index.

Example 14

To Mixture S prepared in Example 13, the following compound (1-5), which is an example of the compound of the formula (1) or (5), and the following compound (2-5), which is an example of the compound of the formula (2) or (6), were added in the following ratios to prepare Mixture U.

| Components of Mixture U | | Mole % |
|---|---|---|
| Compound (1-5) | 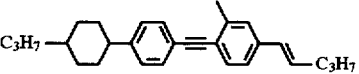 | 10.0 |
| Compound (2-5) | 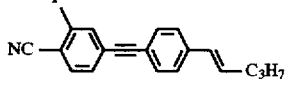 | 10.0 |
| Mixture S | | 80.0 |

The anisotropies of refractive index ($\Delta n$) of Mixtures S and U were 0.102 and 0.175, respectively.

As seen from these values, the liquid crystal mixture of the present invention had the larger anisotropy of refractive index.

Example 15

To Mixture P prepared in Example 11, the following compound (4-5), which is an example of the compound of the formula (4) or (8) or (11) or (15), was added in the following ratios to prepare Mixture V.

| Components of Mixture V | | Mole % |
|---|---|---|
| Compound (4-5) | 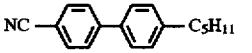 | 22.4 |
| Mixture P | | 77.6 |

To Mixture V, the following compounds (1-3), (1-4) and (1-5), which are examples of the compound of the formula (1) or (5), and the following compounds (2-5) and (2-6), which are examples of the compound of the formula (2) or (6), were added in the following ratios to prepare Mixture W.

| Components of Mixture W | | Mole % |
|---|---|---|
| Compound (1-3) | 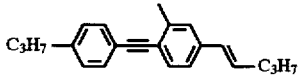 | 8.4 |
| Compound (1-4) | 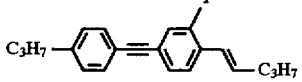 | 5.6 |
| Compound (1-5) | 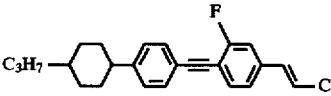 | 9.0 |
| Compound (2-5) | 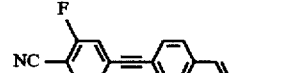 | 4.0 |

-continued

| Components of Mixture W | | Mole % |
|---|---|---|
| Compound (2-6) | NC—⟨F⟩=⟨⟩—C$_5$H$_{11}$ | 6.0 |
| Mixture V | | 67.0 |

The anisotropies of refractive index (Δn) of Mixtures V and W were 0.086 and 0.178, respectively.

As seen from these values, the liquid crystal mixture of the present invention had the larger anisotropy of refractive index.

Example 16

To Mixture P prepared in Example 11, the following compound (4-5), which is an example of the compound of the formula (4) or (8) or (11) or (15), was added in the following ratios to prepare Mixture X.

| Components of Mixture X | Mole % |
|---|---|
| Compound (4-5) | 19.4 |
| Mixture P | 80.6 |

To Mixture X, the following compounds (1-3), (1-4) and (1-5), which are examples of the compound of the formula (1) or (5), and the following compounds (2-5) and (2-6), which are examples of the compound of the formula (2) or (6), were added in the following ratios to prepare Mixture Y.

| Components of Mixture Y | | Mole % |
|---|---|---|
| Compound (1-3) | C$_3$H$_7$—⟨⟩=⟨F⟩—C$_3$H$_7$ | 8.4 |
| Compound (1-4) | C$_3$H$_7$—⟨⟩=⟨F⟩—C$_3$H$_7$ | 5.6 |
| Compound (1-5) | C$_3$H$_7$—⟨⟩—⟨⟩=⟨F⟩—C$_3$H$_7$ | 9.0 |
| Compound (2-5) | NC—⟨F⟩=⟨⟩—C$_3$H$_7$ | 5.0 |
| Compound (2-6) | NC—⟨F⟩=⟨⟩—C$_5$H$_{11}$ | 7.5 |
| Mixture X | | 64.5 |

The anisotropies of refractive index (Δn) of Mixtures X and Y were 0.083 and 0.187, respectively.

As seen from these values, the liquid crystal mixture of the present invention had the larger anisotropy of refractive index.

Example 17

To Mixture A prepared in Example 1, the following compound (3-1), which is an example of the compound of the formula (3), was added in the following ratios to prepare Mixture Z.

| Components of Mixture Z | | Mole % |
|---|---|---|
| Compound (3-1) | C$_3$H$_7$—⟨⟩=⟨⟩—⟨⟩—C$_3$H$_7$ | 15 |
| Mixture A | | 85 |

The anisotropies of refractive index (Δn) and the upper limit temperatures (TNI) of the nematic phase of Mixtures A and Z were as follows:

| Mixture | Δn | TNI |
|---|---|---|
| Mixture Z | 0.167 | 125 |
| Mixture A | 0.136 | 72 |

As seen from the above values, the liquid crystal mixture of the present invention had the larger anisotropy of refractive index and also the higher TNI.

Example 18

To Mixture P prepared in Example 11, the following compounds (1-6), which is an example of the compound of the formula (1), was added in the following ratios to prepare Mixture AA.

| Components of Mixture AA | | Mole % |
|---|---|---|
| Compound (1-6) | C$_3$H$_7$—⟨⟩=⟨⟩—C$_3$H$_7$ | 10 |
| Mixture P | | 90 |

The anisotropies of refractive index (Δn) of Mixtures P and AA were 0.058 and 0.084, respectively.

As seen from these values, the liquid crystal mixture of the present invention had the larger anisotropy of refractive index.

Example 19

The compounds (4-10) and (4-11), which are examples of the compound of the formula (4) or (10), were mixed in the following ratios to prepare Mixture AB.

| Components of Mixture AB | | Mole % |
|---|---|---|
| Compound (4-10) | C$_5$H$_{11}$—⟨⟩—⟨⟩—CN | 40 |
| Compound (4-11) | C$_3$H$_7$—⟨⟩—⟨⟩—CN | 60 |

To Mixture AB, the following compound (2-2), which is an example of the compound of the formula (2) or (6), was added in the following ratios to prepare Mixture AC.

| Components of Mixture AC | | Mole % |
|---|---|---|
| Compound (2-2) | NC—⟨⟩—≡—⟨⟩—\\—C$_3$H$_7$ | 10 |
| Mixture AB | | 90 |

The anisotropies of refractive index ($\Delta n$), the anisotropy of dielectric constant ($\Delta \epsilon$) and the upper limit temperature of the nematic phase (TNI) of Mixtures AB and AC were as follows:

| Mixture | $\Delta n$ | $\Delta \epsilon$ | TNI |
|---|---|---|---|
| Mixture AB | 0.082 | 7.8 | 60 |
| Mixture AC | 0.09 | 9.4 | 65 |

As seen from the above values, the liquid crystal mixture of the present invention had the larger anisotropy of refractive index. In addition, the liquid crystal mixture of the present invention had the larger anisotropy of dielectric constant and the higher TNI.

Example 20

To Mixture P prepared in Example 11, the following compound (4-12), which is an example of the compound of the formula (4) or (8) or (13), was added in the following ratios to prepare Mixture AD.

| Components of Mixture AD | | Mole % |
|---|---|---|
| Compound (4-12) | C$_7$H$_{15}$—⟨⟩—COO—⟨⟩—CN | 10.0 |
| Mixture P | | 90.0 |

To Mixture AD, the following compound (1-7), which is an example of the compound of the formula (1) or (5), was added in the following ratios to prepare Mixture AE.

| Components of Mixture AE | | Mole % |
|---|---|---|
| Compound (1-7) | C$_3$H$_7$—⟨⟩—⟨⟩—=—⟨F⟩—\\—C$_3$H$_7$ | 13.0 |
| Mixture AD | | 87.0 |

The anisotropies of refractive index ($\Delta n$) of Mixtures AD and AE were 0.072 and 0.122, respectively.

As seen from these values, the liquid crystal mixture of the present invention had the larger anisotropy of refractive index.

Example 21

The compound (1-5), which is an example of the compound of the formula (1) or (5), the compounds (4-6) and (4-7), which are examples of the compound of the formula (4) or (9) or (10) or (12) or (16), and the compound (4-5), which is an example of the compound of the formula (4) or (8) or (11) or (15), were mixed in the following ratios to prepare Mixture AF.

| Components of Mixture AF | | Mole % |
|---|---|---|
| Compound (1-5) | C$_3$H$_7$—⟨H⟩—⟨⟩—=—⟨F⟩—\\—C$_3$H$_7$ | 13.0 |
| Compound (4-5) | NC—⟨⟩—⟨⟩—C$_5$H$_{11}$ | 28.0 |
| Compound (4-6) | C$_3$H$_7$—⟨H⟩—⟨⟩—OC$_2$H$_5$ | 24.8 |
| Compound (4-7) | C$_3$H$_7$—⟨H⟩—⟨H⟩—C$_4$H$_9$ | 34.2 |

The anisotropies of refractive index ($\Delta n$), the viscosities ($\eta$), and response parameters ($\eta/\Delta n^2$) of Mixtures AF and A were as follows:

| Mixture | $\Delta n$ | $\eta$ (cp) | $\eta/\Delta n^2$ (cp) |
|---|---|---|---|
| Mixture AF | 0.146 | 14.2 | 666 |
| Mixture A | 0.136 | 36.3 | 1963 |

As seen from the above values, the liquid crystal mixture of the present invention had the larger anisotropy of refractive index, the lower viscosity, and the smaller response parameter.

Since the liquid crystal mixture of the present invention has a large anisotropy of refractive index, it will provide a liquid crystal device which can be used as an optical shutter or a display device examples of which are a STN liquid crystal device and a PDLC liquid crystal device.

Some of the liquid crystal mixture of the present invention have a very large resistivity, it can be used as a component of a liquid crystal which uses the active matrix system such as TFT.

Effects of the Invention

The liquid crystal mixture of the present invention has a large anisotropy of refractive index ($\Delta n$). The liquid crystal mixture of the present invention includes those having a large anisotropy of dielectric constant ($\Delta \epsilon$) and a nematic phase in a wide temperature range including room temperature, in addition to the large anisotropy of refractive index ($\Delta n$), and those having a good response property because of a low viscosity and a small response parameter ($\eta/\Delta n^2$).

In view of the chemical structure of the liquid crystal compound to be contained in the mixture, the liquid crystal mixture of the present invention is expected to have a very sharp threshold value property, so that it is very useful to improve the picture quality of the STN liquid crystal device and to increase a yield of the liquid crystal devices.

What is claimed is:

1. A liquid crystal mixture comprising
   (a) at least one compound selected from the group consisting of a compound of the formula (1):

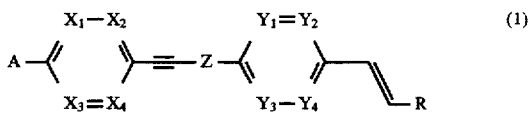

(1)

wherein R is a $C_1$–$C_{12}$ alkyl group, a $C_2$–$C_{16}$ alkenyl group or a $C_2$–$C_{16}$ alkoxyalkyl group; $X_1$, $X_2$, $X_3$, $X_4$, $Y_1$, $Y_2$, $Y_3$ and $Y_4$ represent, independently each other, CH, CF or N; A is a hydrogen atom, a 4-$R_1$-(cycloalkyl) group, a 4-$R_1$-(cycloalkenyl) group or a $R_1$—(O)$_p$ group in which $R_1$ is a $C_1$–$C_{12}$ alkyl group, a $C_2$–$C_{12}$ alkenyl group, a $C_2$–$C_{12}$ alkynyl group or a $C_2$–$C_{12}$ alkoxyalkyl group, and p is 0 or 1; and Z is —C≡C— or a single bond, a compound of the formula (2):

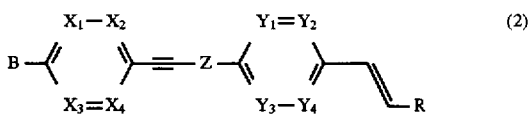

(2)

wherein B is a fluorine atom, a trifluoromethyl group, a trifluoromethoxy group or a cyano group, and R, $X_1$, $X_2$, $X_3$, $X_4$, $Y_1$, $Y_2$, $Y_3$, $Y_4$ and Z are the same as defined in the formula (1) and a compound of the formula (3):

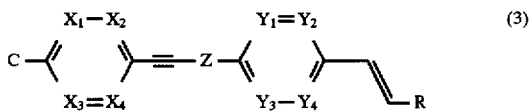

(3)

wherein C is a $C_1$–$C_{12}$ alkyl group, a $C_2$–$C_{12}$ alkenyl group, a $C_2$–$C_{16}$ alkoxyalkyl group, a 4-$R_1$-(cycloalkyl) group, a 4-$R_1$-(cycloalkenyl) group or a $R_1$—(O)$_p$ group, a fluorine atom, a trifluoromethyl group, a trifluoromethoxy group or a cyano group; and R, $X_1$, $X_2$, $X_3$, $X_4$, $Y_1$, $Y_2$, $Y_3$, $Y_4$, $R_1$ and p are the same as defined in the formula (1), and (b) at least one compound of the formula (4):

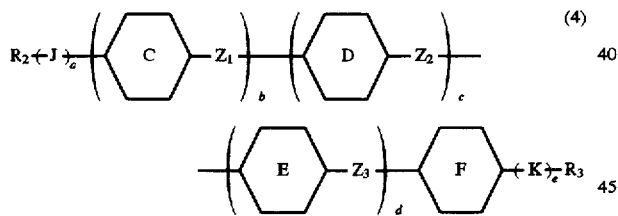

(4)

wherein rings C, D, E and F represent, independently of each other, 1,4-phenylene, 1,4-cyclohexylene, [1,4-cyclohexelene, 4,1-cyclohexelene, 2,5-cyclohexelene, 5,2-cyclohexelene, 3,6-cyclohexelene, 6,3-cyclohexelene], 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which may be substituted by 1, 2 or 3 fluorine atoms; $R_2$ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; $R_3$ is a hydrogen atom, a fluorine atom, a fluoromethyl group, a difluoromechyl group, a triluoromethyl group, a fluoromethoxy group, a difluoromethoxy group, a trifluoromethoxy group, a cyano group, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; $Z_1$, $Z_2$ and $Z_3$ represent, independently of each other, —COO—, —OCO—, —OCH$_2$—, —CH$_2$O—, a $C_1$–$C_5$ alkylene group, a $C_2$–$C_5$ alkenylene group, a $C_2$–$C_5$ alkynylene group or a single bond; J and K represent, independently of each other, a methylene group or —O—; a, b, c, d and e represent, independently of each other, 0 or 1 with the proviso that a sum of b, c and d is at least 1 (one), that when $R_2$ is an alkoxy group, a is 0 (zero), that when $R_3$ is an alkoxy group, e is 0 (zero), and that in the case where $R_2$ and $R_3$ are not alkoxy groups, a is 1 when b is 1 and the ring C is a 1,4-phenylene, 2,5-pyrimidinediyl, 5,2-pyrimidinediyl, 2,5-pyridinediyl or 5,2-pyridinediyl, or when b is 0, c is 1 and the ring D is 1,4-phenylene, 2,5-pyrimidinediyl, 5,2-pyrimidinedial, 2,5-pyridinediyl or 5,2-pyridinediyl, or when b is 0, c is 0, d is 1 and the ring E is 1,4-phenylene, 2,5-pyrimidinediyl, 5,2-pyrimidinediyl, 2,5-pyridinediyl or 5,2-pyridinediyl; or e is 1 when the ring F is 1,4-phenylene, 2,5-pyrimidinediyl, 5,2-pyrimidinediyl, 2,5-pyridinediyl or 5,2-pyridinediyl, which compound (4) is not a compound of the formula (1), (2) or (3).

2. The liquid crystal mixture according to claim 1, which comprises at least one compound selected from the group consisting the compound of the formula (1) and the compound of the formula (2); at least one compound of the formula (3); and at least one compound of the formula (4).

3. The liquid crystal mixture according to claim 1, which comprises at least one compound selected from the group consisting the compound of the formula (1) and the compound of the formula (2); and at least one compound of the formula (4).

4. The liquid crystal mixture accrding to claim 1, which comprises (a') at least one compound selected from the group consisting of a compound of the formula (5):

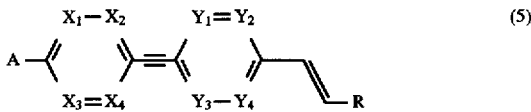

(5)

wherein R is a $C_1$–$C_{12}$ alkyl group, a $C_2$–$C_{12}$ alkenyl group or a $C_2$–$C_{16}$ alkoxyalkyl group; $X_1$, $X_2$, $X_3$, $X_4$, $Y_1$, $Y_2$, $Y_3$ and $Y_4$ represent, independently each other, CH, CF or N; and A is a hydrogen atom, a 4 $R_1$-(cycloalkyl) group, 4-$R_1$-(cycloalkenyl) group or a $R_1$—(O)$_p$ group in which $R_1$ is a $C_1$–$C_{12}$ alkyl group, a $C_2$–$C_{12}$ alkenyl group or a $C_2$–$C_{12}$ alkynyl group, and p is 0 or 1, a compound of the formula (6):

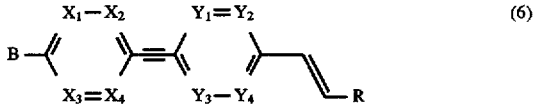

(6)

wherein B is a fluorine atom, a trifluoromethyl group, a trifluoromethoxy group or a cyano group; and R, $X_1$, $X_2$, $X_3$, $X_4$, $Y_1$, $Y_2$, $Y_3$ and $Y_4$ are the same as defined in the formula (5) and a compound of the formula (7):

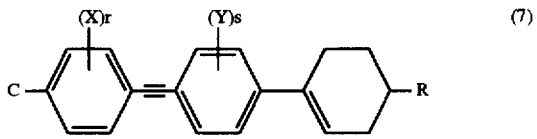

(7)

wherein C is a hydrogen atom, a fluorine atom, a trifluoromethyl group, a tifluoromethoxy group, a cyano group, a 4-$R_1$-(cycloalkyl) group, 4-$R_1$-(cycloalkenyl) group or a $R_1$—(O)$_p$ group in which $R_1$ and p are the same as defined in the formula (5); R is a $C_1$–$C_{12}$ alkyl group, a $C_2$–$C_{12}$ alkenyl group or a $C_2$–$C_{16}$ alkoxyalkyl group; X and Y represent, independently each other, a hydrogen atom or a fluorine atom; and r and s are each an integer from 0 to 3, and (b') at least one compound selected from the group consisting of a compound of the formula (8):

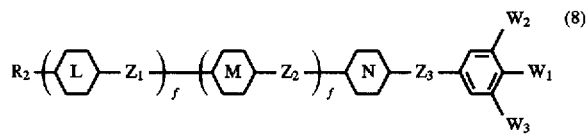

wherein R₂ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L, M and N represent, independently each other, 1,4-phenylene, 1,4-cyclohexylene, 2,5-pyrimidinediyl, 5,2-pyrimidinediyl, 2,5-dioxanediyl or 5,2-dioxanediyl; $Z_1$, $Z_2$ and $Z_3$ represent, independently each other, —COO—, —OCO—, —OCH₂—, —CH₂O—, a $C_1$–$C_5$ alkylene group, a $C_2$–$C_5$ alkenylene group, a $C_2$–$C_5$ alkynylene group or a single bond; $W_1$ is a hydrogen atom, a fluorine atom, a fluoromethyl group, a difluoromethyl group, a trifluoromethyl group, a fluoromethoxy group, a difluoromethoxy group, a trifluoromethoxy group or a cyano group; $W_2$ and $W_3$ represent, independently each other, a hydrogen atom or a fluorine atom; and each f is 0 or 1 and a compound of the formula (9):

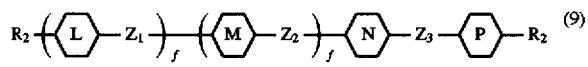

wherein each R₂ is a hydrogen atom, a $C_1$–$C_{12}$ alkyl group, a $C_2$–$C_{12}$ alkenyl group, a $C_1$–$C_{16}$ alkoxy group or a $C_2$–$C_{16}$ alkoxyalkyl group; rings L, M, N and P represent, independently each other, 1,4-phenylene, 1,4-cyclohexylene, 2,5-pyrimidinediyl, 5,2-pyrimidinediyl, 2,5-dioxanediyl or 5,2-dioxanediyl; $Z_1$, $Z_2$ and $Z_3$ represent, independently each other, —COO—, —OCO—, —OCH₂—, —CH₂O—, a $C_1$–$C_5$ alkylene group, a $C_2$–$C_5$ alkenylene group, a $C_2$–$C_5$ alkynylene group or a single bond; and each f is 0 or 1.

5. The liquid crystal mixture according to claim 4, which comprises at least one compound selected from the group consisting of the compound of the formula (5) and the compound of the formula (6); at least one compound of the formula (7); and at least one compound selected from the group consisting of the compound of the formula (8) and the compound of the formula (9).

6. The liquid crystal mixture according to claim 4, which comprises at least one compound selected from the group consisting of the compound of the formula (5) and the compound of the formula (6), and at least one compound selected from the group consisting of the compound of the formula (8) and the compound of the formula (9).

7. The liquid crystal mixture according to claim 1, which comprises at least one compound selected from the group consisting of the compound of the formula (1) and the compound of the formula (2), and at least one compound of the formula (4), provided that the mixture contains at least one compound of the formula (4) in which at least one of the rings C, D, E and F is 1,4-phenylene, [1,4-cyclohexelene, 4,1-cyclohexelene, 2,5-cyclohexelene, 5,2-cyclohexelene, 3,6-cyclohexelene, 6,3-cyclohexelene], 1,4-cyclohexenylene, 4,1-cyclohexenylene, 2,5-cyclohexenylene, 5,2-cyclohexenylene, 3,6-cyclohexenylene, 6,3-cyclohexenylene, 2,5-pyrimidinediyl, 5,2-pyrimidinediyl, 2,5-pyridinediyl, 5,2-pyridinediyl, 2,5-dioxanediyl or 5,2-dioxanediyl, each of which is substituted by 1, 2 or 3 fluorine atoms.

8. The liquid crystal mixture according to claim 1, which comprises at least one compound selected from the group consisting of the compound of the formula (1) and the compound of the formula (2), and at least one compound of the formula (4) in which the ring F is 1,4-cyclohexylene, 2,5-dioxanediyl or 5,2-dioxanediyl, each of which may be substituted by 1, 2 or 3 fluorine atoms.

9. The liquid crystal mixture according to claim 1, which comprises at least one compound selected from the group consisting of the compound of the formula (1) and the compound of the formula (2), and at least one compound of the formula (10):

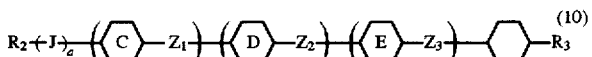

wherein the rings C, D and E, $R_2$, $R_3$, $Z_1$, $Z_2$, $Z_3$, J, a, b, c and d are the same as defined in the formula (4).

10. The liquid crystal mixture according to claim 1, which comprises at least one compound selected from the group consisting of the compound of the formula (1) and the compound of the formula (2), and at least one compound of the formula (4) in which the ring F is 1,4-phenylene, 2,5-pyrimidinediyl, 5,2-pyrimidinediyl, 2,5-pyridinediyl or 5,2-pyridinediyl, each of which may be substituted by 1, 2 or 3 fluorine atoms.

11. The liquid crystal mixture according to claim 1, which comprises at least one compound selected from the group consisting of the compound of the formula (1) and the compound of the formula (2), and at least one compound of the formula (11):

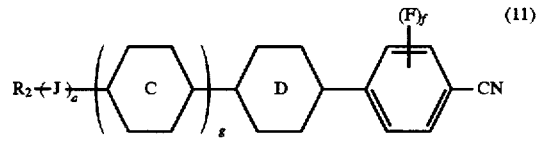

wherein R₂, J and the rings C and D are the same as defined in the formula (4); a and g are each 0 or 1; and f is 0, 1 or 2, provided that, when R₂ is an alkoxy group, a is 0, and that in the case where R₂ is not an alkoxy group, a is 1 when g is 1, and the ring C is 1,4-phenylene, 2,5-pyrimidinediyl, 5,2-pyrimidinediyl, 2,5-pyridinediyl or 5,2-pyridinediyl, which compound (11) is not a compound of the formula (1) or (2).

12. The liquid crystal mixture according to claim 1, which comprises at least one compound selected from the group consisting of the compound of the formula (1) and the compound of the formula (2), and at least one compound of the formula (12):

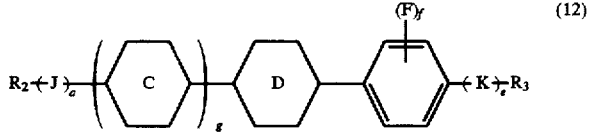

wherein R₂, J, the rings C and D, a, g and f are the same as defined in the formula (11); and R₃ and K are the same as defined in the formula (4), provided that e is 0 when R₃ is an alkoxy group or e is 1 when R₃ is not an alkoxy group, which compound (12) is not a compound of the formula (1) or (2).

13. The liquid crystal mixture according to claim 1, which comprises at least one compound selected from the group consisting of the compound of the formula (1) and the compound of the formula (2), and at least one compound selected from the group consisting of a compound of the formula (13):

51

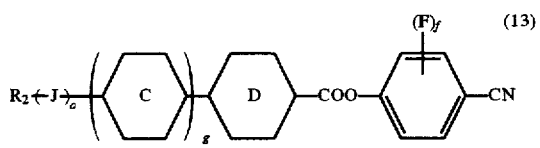

wherein $R_2$, J, the rings C and D, a, g and f are the same as defined in the formula (11), provided that a is 0 when $R_2$ is an alkoxy group, and that in the case where $R_2$ is not an alkoxy group, a is 1 when g is 1 and the ring C is 1,4-phenylene, 2,5-pyrimidinediyl, 5,2-pyrimidinediyl, 2,5-pyridinediyl or 5,2-pyridinediyl, which compound (13) is not a compound of the formula (1) or (2) and a compound of the formula (14):

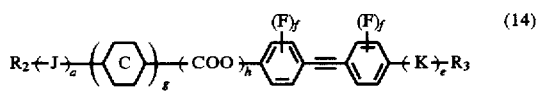

wherein $R_2$, J, the ring C, a, g, $R_3$, K, e and f are the same as defined in the formula (12); and h is 0 or 1, which compound (14) is not a compound of the formula (1) or (2).

14. The liquid crystal mixture according to claim 1, which comprises at least one compound selected from the group consisting of the compound of the formula (1) and the compound of the formula (2), and at least one compound of the formula (4), in which the ring F is [1,4-cyclohexelene, 4,1-cyclohexelene, 2,5-cyclohexelene, 5,2-cyclohexelene, 3,6-cyclohexelene, 6,3-cyclohexelene], 1,4-cyclohexenylene, 4,1-cyclohexenylene, 2,5-cyclohexenylene, 5,2-cyclohexenylene 3,6-cyclohexenylene, 6,3-cyclohexenylene, each of which may be substituted by 1, 2 or 3 fluorine atoms.

15. The liquid crystal mixture according to claim 4, which comprises at least one compound selected from the group consisting of the compound of the formula (5), the compound of the formula (6) and the compound of the formula (7), and at least one compound selected from the group consisting of a compound of the formula (15):

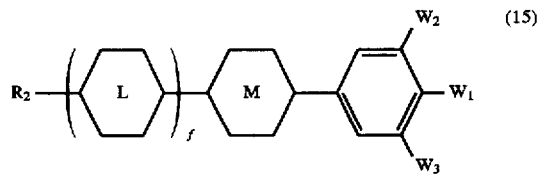

wherein $R_2$ is a hydrogen atom, a $C_1-C_{12}$ alkyl group, a $C_2-C_{12}$ alkenyl group, a $C_1-C_{16}$ alkoxy group or a $C_2-C_{16}$ alkoxyalkyl group; rings L and M represent, independently each other, 1,4-phenylene, 1,4-cyclohexylene, 2,5-pyrimidinediyl, 5,2-pyrimidinediyl, 2,5-dioxanediyl or 5,2-dioxanediyl; $W_1$ is a hydrogen atom, a fluorine atom, a fluoromethyl group, a difluoromethyl group, a trifluoromethyl group, a fluoromethoxy group, a difluoromethoxy group, a trifluoromethoxy group or a cyano group; $W_2$ and $W_3$ represent, independently each other, a hydrogen atom or a fluorine atom; and each f is 0 or 1 and a compound of the formula (16):

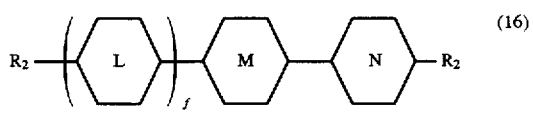

wherein each $R_2$ is a hydrogen atom, a $C_1-C_{12}$ alkyl group, a $C_2-C_{12}$ alkenyl group, a $C_1-C_{16}$ alkoxy group or a $C_2-C_{16}$ alkoxyalkyl group; rings L, M and N represent, independently each other, 1,4-phenylene, 1,4-cyclohexylene, 2,5-pyrimidinediyl, 5,2-pyrimidinediyl, 2,5-dioxanediyl or 5,2-dioxanediyl; and each f is 0 or 1.

16. The liquid crystal mixture according to claim 4, which comprises at least one compound selected from the group consisting of the compound of the formula (5) and the compound of the formula (6), at least one compound of the formula (7), and at least one compound selected from the group consisting of the compound of the formula (15) and the compound of the formula (16).

17. The liquid crystal mixture according to claim 4, which comprises at least one compound selected from the group consisting of the compound of the formula (5) and the compound of the formula (6), and at least one compound selected from the group consisting of the compound of the formula (15) and the compound of the formula (16).

18. The liquid crystal mixture according to claim 1, wherein R is an alkyl group, alkenyl or alkoxyalkyl group which is fluorinated, and at least one of $R_1$, $R_2$ and $R_3$ is a alkyl group, alkenyl, alkynyl or alkoxyalkyl group which is fluorinated.

19. The liquid crystal mixture according to claim 4, wherein R is an alkyl group, alkenyl or alkoxyalkyl group which is fluorinated, and at least one of $R_1$ and $R_2$ is a alkyl group, alkenyl, alkynyl or alkoxyalkyl group which is fluorinated.

20. A liquid crystal device comprising a pair of electrode substrates, and a layer of a liquid crystal mixture according to claim 1 present between said pair of the electrode substrates.

* * * * *